US008484432B2

(12) United States Patent
Hatsuda et al.

(10) Patent No.: US 8,484,432 B2
(45) Date of Patent: Jul. 9, 2013

(54) MEMORY SYSTEM

(75) Inventors: Kosuke Hatsuda, Tokyo (JP);
Daisaburo Takashima, Yokohama (JP);
Yasushi Nagadomi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 529 days.

(21) Appl. No.: 12/401,130

(22) Filed: Mar. 10, 2009

(65) Prior Publication Data
US 2009/0235015 A1 Sep. 17, 2009

(30) Foreign Application Priority Data

Mar. 11, 2008 (JP) .................................. 2008-061655
Mar. 19, 2008 (JP) .................................. 2008-071576

(51) Int. Cl.
*G06F 12/00* (2006.01)
(52) U.S. Cl.
USPC .................................. 711/173; 711/E12.006
(58) Field of Classification Search
USPC .................................................. 711/103, 170
See application file for complete search history.

(56) References Cited

U.S. PATENT DOCUMENTS

| 2003/0225961 | A1 | 12/2003 | Chow et al. | |
|---|---|---|---|---|
| 2004/0111553 | A1* | 6/2004 | Conley | 711/103 |
| 2005/0055532 | A1* | 3/2005 | Yu | 711/203 |
| 2006/0044881 | A1* | 3/2006 | Tran et al. | 365/189.06 |
| 2006/0282610 | A1* | 12/2006 | Dariel et al. | 711/103 |
| 2007/0103992 | A1 | 5/2007 | Sakui et al. | |

FOREIGN PATENT DOCUMENTS

| JP | 10-154101 | 6/1998 |
|---|---|---|
| JP | 2005-528696 | 9/2005 |
| JP | 2007-183962 | 7/2007 |
| JP | 2009-230205 | 10/2009 |
| WO | WO 03/102782 A1 | 12/2003 |
| WO | WO 2007/019220 A2 | 2/2007 |

OTHER PUBLICATIONS

Japanese Office Action issued on Jan. 18, 2011, in Japanese Patent Application No. 2008-071576 (with English Translation).
U.S. Appl. No. 12/566,236, filed Sep. 24, 2009, Yano, et al.
U.S. Appl. No. 12/563,856, filed Sep. 21, 2009, Yano, et al.
Japanese Office Action issued Jan. 10, 2012 in patent application No. 2011-177044 with English translation.

* cited by examiner

*Primary Examiner* — Edward Dudek, Jr.
*Assistant Examiner* — Sean D Rossiter
(74) *Attorney, Agent, or Firm* — Oblon, Spivak, McClelland, Maier & Neustadt, L.L.P.

(57) ABSTRACT

A memory system includes a non-volatile memory constituted by blocks each of which is an erase unit constituted by pages each of which is a write/read unit constituted by memory cells; a random access memory temporarily storing data which is written in or read from the non-volatile memory; and a controller controlling the non-volatile memory and the random access memory, wherein the non-volatile memory includes a main memory area in which the block is divided into first management units respectively specified by logical addresses and a cache area in which the block is divided into second management units respectively specified by logical addresses, a data capacity of one of the second management units is smaller than that of one of the first management units, and the controller changes number of the blocks in the main memory area and number of the blocks in the cache area in the non-volatile memory.

14 Claims, 24 Drawing Sheets

| SSD LOGICAL ADDRESS | PC LOGICAL ADDRESS |
|---|---|
| 0 | 8 |
| 8 | 8(n-2) |
| 16 | 0 |
| ⋮ | ⋮ |
| 8(k-1) | 8(n-1) |
| 8k | 16 |
| ⋮ | ⋮ |
| 8(k-1) | 0xFF |
| 8m | 13 |
| 8m+1 | 8n-6 |
| ⋮ | ⋮ |
| 8p-2 | 4 |
| 8p-1 | 0xFF |

(rows 1–7 = MAIN MEMORY; rows 8–12 = CACHE)

LOGIC/LOGIC CONVERSION TABLE

FIG. 8

| SSD LOGICAL ADDRESS | SSD PHYSICAL ADDRESS |
|---|---|
| 0 | q+1 |
| 16 | 0 |
| ⋮ | ⋮ |
| 8(m-2) | r |
| 8m | q |
| ⋮ | ⋮ |
| 8(p-2) | 1 |

LOGICAL/PHYSICAL CONVERSION TABLE

FIG. 9

| SSD LOGICAL ADDRESS | PC LOGICAL ADDRESS |
|---|---|
| 0 | 8 |
| 8 | 8(n−2) |
| 16 | 0 |
| ⋮ | ⋮ |
| 8(k−1) | 8(n−1) |
| 8k | 16 |
| ⋮ | ⋮ |
| 8(k−1) | 0xFF |
| 8m | 13 |
| 8m+1 | 8n−6 |
| ⋮ | ⋮ |
| 8p−2 | 4 |
| 8p−1 | 0xFF→9 |

Rows 1–8 are MAIN MEMORY; rows 9–13 are CACHE.

LOGIC/LOGIC CONVERSION TABLE

FIG. 11

| SSD LOGICAL ADDRESS | PC LOGICAL ADDRESS |
|---|---|
| 0 | 8 |
| 8 | 8(n-2) |
| 16 | 0 |
| ⋮ | ⋮ |
| 8(k-1) | 8(n-1) |
| 8k | 16 |
| ⋮ | ⋮ |
| 8(k-1) | 0xFF |
| 8m | 13 |
| 8m+1 | 8n-6 |
| ⋮ | ⋮ |
| 8p-2 | 4→0xFF |
| 8p-1 | 0xFF→4 |

{ Rows 1–8 = MAIN MEMORY; Rows 9–13 = CACHE }

LOGIC/LOGIC CONVERSION TABLE

FIG. 13

| | SSD LOGICAL ADDRESS | PC LOGICAL ADDRESS |
|---|---|---|
| MAIN MEMORY | 0 | 8 |
| | 8 | 8(n-2) |
| | 16 | 0 |
| | ⋮ | ⋮ |
| | 8(k-1) | 8(n-1) |
| | 8k | 16 |
| | ⋮ | ⋮ |
| | 8(k-1) | 0xFF |
| CACHE | 8m | 13 |
| | 8m+1 | 8n-6 |
| | ⋮ | ⋮ |
| | 8p-2 | 0xFF |
| | 8p-1 | 4 |

LOGIC/LOGIC CONVERSION TABLE

FIG. 15

SSD PHYSICAL ADDRESS

SEGMENT CORRESPONDING TO
PC LOGICAL ADDRESS "13"

| SSD LOGICAL ADDRESS | PC LOGICAL ADDRESS |
|---|---|
| 0 | 8→0xFF |
| 8 | 8(n-2) |
| 16 | 0 |
| ⋮ | ⋮ |
| 8(k-1) | 8(n-1) |
| 8k | 16 |
| ⋮ | ⋮ |
| 8(k-1) | 0xFF |
| 8m | 13→0xFF |
| 8m+1 | 8n-6 |
| ⋮ | ⋮ |
| 8p-2 | 0xFF |
| 8p-1 | 4 |

(MAIN MEMORY: rows 0 through 8(k-1))
(CACHE: rows 8m through 8p-1)

LOGIC/LOGIC CONVERSION TABLE

US 8,484,432 B2

MEMORY SYSTEM

CROSS-REFERENCE TO RELATED APPLICATIONS

This application is based upon and claims the benefit of priority from the prior Japanese Patent Applications No. 2008-61655, filed on Mar. 11, 2008, and No. 2008-71576, filed on Mar. 19, 2008, the entire contents of which are incorporated herein by reference.

BACKGROUND OF THE INVENTION

1. Field of the Invention

The present invention relates to a memory system, and particularly to a memory system using a flash EEPROM non-volatile memory, for example.

2. Related Art

Semiconductor memories are employed for main storages of large computers, personal computers, household electric appliances, cell phones and the like. Flash EEPROM non-volatile memories (hereinafter, "NAND flash memories") are applied to various memory mediums (such as SD cards, MMCs (Multi Media Cards), MS (Magnetic Stripe) cards, CF (Compact Flash) cards, USB memories, SSDs (Solid-State-Disks)). The NAND flash memories are used as information (images, videos, sound, and games) storage mediums for cell phones, digital cameras, digital video cameras, music devices such as MP3, mobile devices, digital televisions and the like. Further, the NAND flash memories are used as storage mediums instead of HDDs in personal computers (SSDs (Solid State Drives)).

According to the NAND flash memory, a data writing/reading operation is performed per page formed of a plurality of memory cells and the data is erased per block formed of a plurality of the pages.

The NAND flash memory has limited numbers of data readings, writings, and erasures. The data in the NAND flash memory is usually deteriorated by the number of data readings, writings, or erasures of around $10^5$. When the NAND flash memory is used as the SSD, its lifetime will end in a short period of time.

Further, even if data with lower capacity than a block's capacity is written/read more frequently, the data is erased per block. The number of erasures is therefore increased, causing the memory to be deteriorated rapidly. Generally, the low capacity data is handled more often than data with higher capacity than the block's capacity such as image data and music files in a personal computer use environment.

The deterioration of the NAND flash memory may be suppressed by using RAMs including DRAM and FeRAM as a buffer or cache of the NAND flash memory. However, the NAND flash memory for SSD has recently a high capacity. It is thus difficult to obtain RAMs with sufficiently high capacity to suppress the deterioration of the NAND flash memory. This is because a user available area is reduced.

According to the NAND memory, the shorter an erasing time interval becomes, the worse a retention characteristic (data retention characteristic) becomes. Recently, systems for extending the erasing time interval are required.

SUMMARY OF THE INVENTION

A memory system according to an embodiment of the present invention comprises: a non-volatile memory constituted by a plurality of blocks each of which is an erase unit constituted by a plurality of pages each of which is a write/read unit constituted by a plurality of memory cells each of which has a floating gate and can erase, write, and read data electrically; a random access memory temporarily storing data which is written in or read from the non-volatile memory; and a controller controlling the non-volatile memory and the random access memory, wherein the non-volatile memory includes a main memory area in which the block is divided into first management units respectively specified by logical addresses and a cache area in which the block is divided into second management units respectively specified by logical addresses, a data capacity of one of the second management units is smaller than that of one of the first management units, and the controller dynamically changes number of the blocks in the main memory area and number of the blocks in the cache area in the non-volatile memory.

A memory system according to an embodiment of the present invention comprises: a flash EEPROM memory that its read/write unit is different from its erase unit and a RAM; and a controller controlling the flash EEPROM memory and the RAM, wherein the flash EEPROM memory has at least a first storage area and a second storage area which have different applications for data to be stored from each other, the controller has a function of managing a first list storing data which indicates block areas being used among erase units of the flash EEPROM memory, a second list storing data which indicates unused or used block areas, and a third list and a fourth list which are provided for ensuring an erase interval for the flash EEPROM memory, the third list and the fourth list store data indicating the used block areas for the first storage area and the second storage area, respectively, and the third list and the fourth list store data have different numbers of data entries from each other.

BRIEF DESCRIPTION OF THE DRAWINGS

FIG. 8 is a logic/logic conversion table between the PC logical address and the SSD logical address;

FIG. 9 is a logical/physical conversion table between the SSD logical address and the SSD physical address;

FIG. 11 shows a logic/logic conversion table updated in a write operation;

FIG. 13 shows a logic/logic conversion table updated in a write operation;

FIG. 15 is a logic/logic conversion table after update shown in FIG. 13;

DETAILED DESCRIPTION OF THE INVENTION

Embodiments of the present invention will be explained below in detail with reference to the accompanying drawings. Note that the invention is not limited thereto.

Flash EEPROM non-volatile memories are mainly classified into NOR flash memories and NAND flash memories. According to the NOR flash memories, their reading operation is fast and their number of readings is as large as about $10^{13}$. The NOR flash memories are thus employed as storage devices of instruction codes for mobile devices. However, the NOR flash memories are not suitable for recording files, because their effective writing band width is small.

Meanwhile, the NAND flash memories have a slow access time, for example about 25 µs. The NAND flash memories have higher integration than the NOR flash memories and can perform burst read. The NAND flash memories have a slow data programming (writing) time such as 200 µs, and a slow data erasing time such as about 1 ms. In the NAND flash memories, however, a large number of bits can be erased at a time, data can be written in a burst mode, a large number of bits can be programmed at a time. The NAND flash memories thus have large effective band width. The NAND flash memories with large effective band width are suitable as file memories such as the memory cards, USB memories, and SSDs mentioned above.

The following embodiments explain a memory system using a NAND flash memory.

First Embodiment

Figure 1:
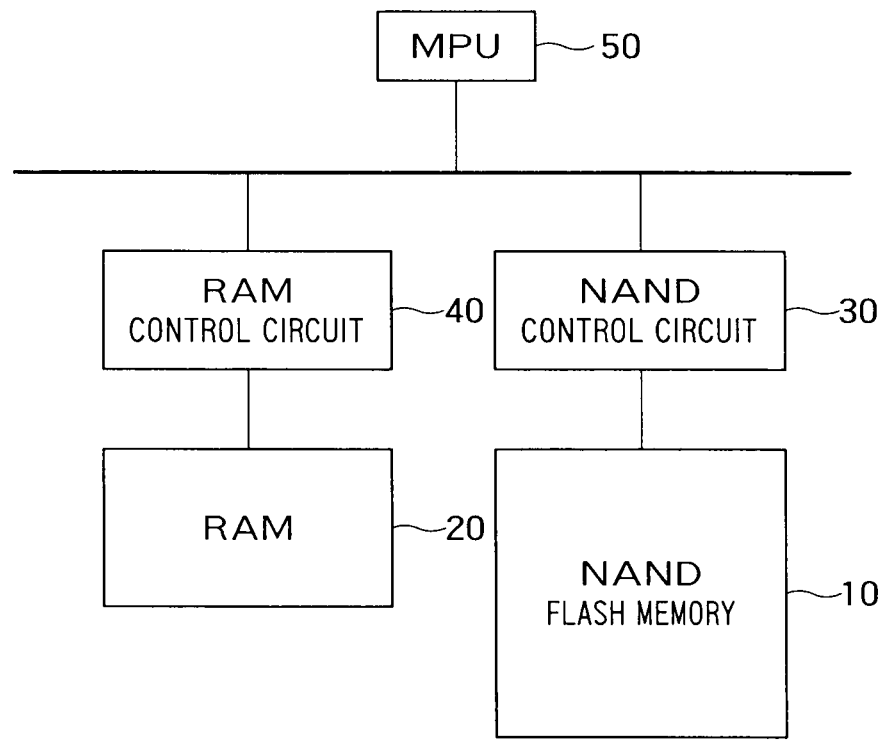
FIG. 1 is a block diagram showing a configuration of a memory system according to a first embodiment of the present invention.

FIG. 1 is a block diagram showing a configuration of a memory system according to a first embodiment of the present invention. The memory system according to the first embodiment includes a NAND flash memory 10, a RAM (Random Access Memory) 20, a NAND control circuit 30 for controlling the NAND flash memory, a RAM control circuit 40 for controlling the RAM, and a MPU (Micro Processing Unit) 50. The NAND flash memory according to the first embodiment is, for example, an SSD incorporated in personal computers. In the appended claims, the NAND control circuit 30, the RAM control circuit 40, and the MPU 50 are collectively referred to as a controller.

The NAND flash memory 10 (hereinafter, simply "the memory 10") has a main memory area for storing data with relatively high capacity and a cache area for storing data with relatively low capacity. The RAM 20 functions as a data save area that is effective when data of part of blocks in the memory 10 is erased. The RAM 20 also functions as a cache temporarily storing data written in or read from the memory 10.

The MPU 50 sends instructions to the NAND control circuit 30 and the RAM control circuit 40 to control them. The MPU 50 manages the number of blocks in the cache area within the memory 10.

Figure 2:
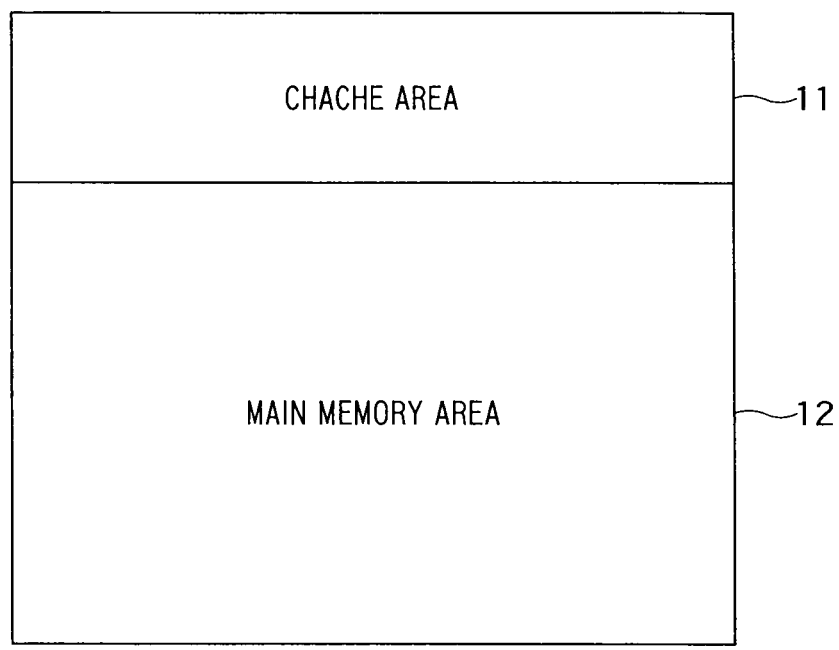
FIG. 2 is a conceptual diagram showing the main memory area 12 and the cache area 11 in the memory 10.

FIG. 2 is a conceptual diagram showing the main memory area 12 and the cache area 11 in the memory 10. In the main memory area 12, a block is divided by relatively large first management unit. The first management unit is a memory unit assigned to every logical address of the memory 10 and data is managed per the memory unit. In the cache area 11, a block is divided by relatively small second management unit. The second management unit is a memory unit that is assigned to every logical address of the memory 10 and has a lower capacity than that of the first management unit. The block in the cache area 11 is segmented finer than that of the main memory area 12 and is suitable for storing low capacity data. The difference between the cache area 11 and the main memory area 12 in the memory 10 is the data capacity of the management unit.

Figure 3:
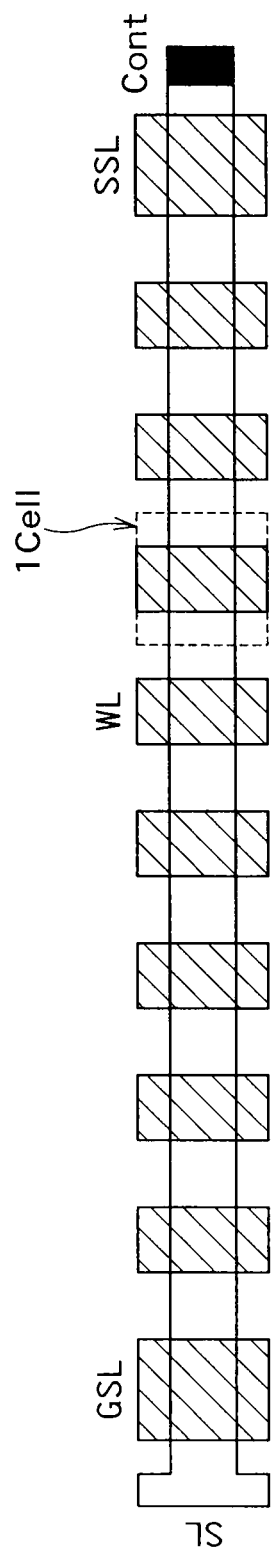
FIG. 3 is a plan view showing a cell string of a NAND EEPROM which is an example of the NAND flash memory.
Figure 4:
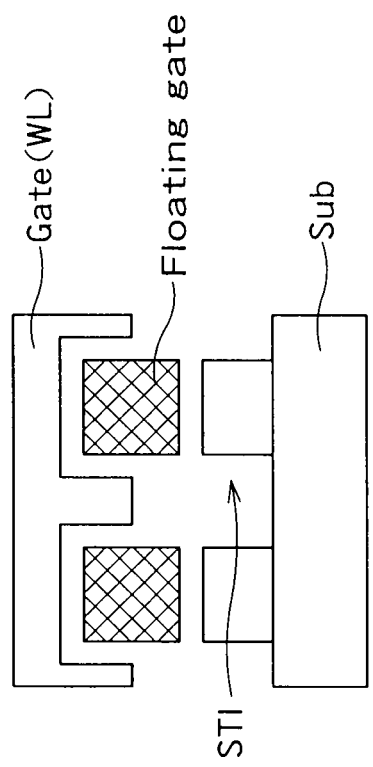
FIG. 4 is a cross-sectional view showing two memory cells in the NAND EEPROM.
Figure 5:
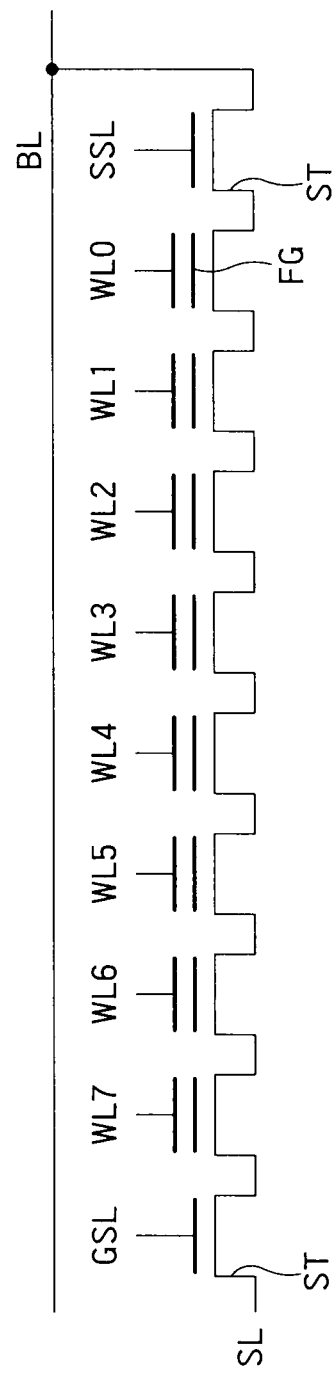
FIG. 5 is an equivalent circuit diagram of the cell string shown in FIG. 3.

FIG. 3 is a plan view showing a cell string of a NAND EEPROM which is an example of the NAND flash memory. FIG. 4 is a cross-sectional view showing two memory cells in the NAND EEPROM. FIG. 5 is an equivalent circuit diagram of the cell string shown in FIG. 3. The cell string is provided by connecting a plurality of memory cells in serial and connected to a source line SL or a bit line BL via a selective transistor ST at ends of the serially connected memory cells. Only one bit line contact and one source line contact are provided for every cell string. One memory cell is placed at every intersection of the word line with the bit line. The NAND EEPROM is thus suitable for high integration as compared to a NOR EEPROM. As shown in FIG. 4, every memory cell has a floating gate FG that is electrically floating above a substrate via a gate dielectric film. A control gate (word line WL) is provided above the floating gate FG via the gate dielectric film. Control of the control gate enables electric charges to be accumulated in or released from the floating gate. The memory cell thus can store or erase the data.

Figure 6:
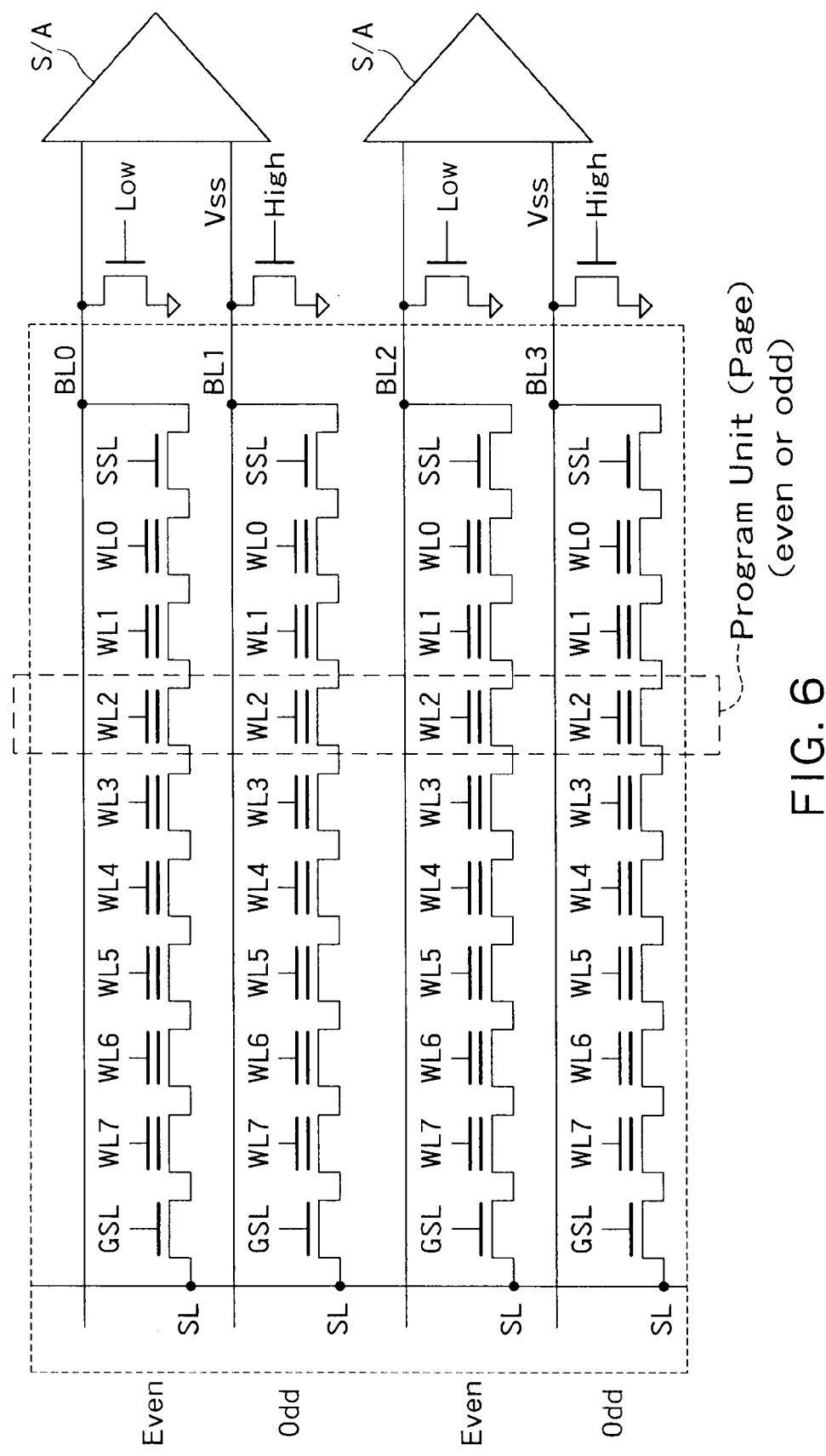
FIG. 6 is a circuit diagram showing an example of a memory block.

FIG. 6 is a circuit diagram showing an example of a memory block. The memory unit where one erase is performed is a memory cell block unit as seen from a bit line BL direction and the entire Mat (WL0 to WL7) as seen from a word line WL direction. The memory capacity of the erase block unit is about 512 KB in the first embodiment. This erase unit is called a block. A write/read unit (page) includes memory cells connected to every other bit line (connected to even bit lines or odd bit lines) among memory cells connected to a word line WL in a block. The memory cells connected to one word line WL are thus constituted by two pages.

Figure 7:
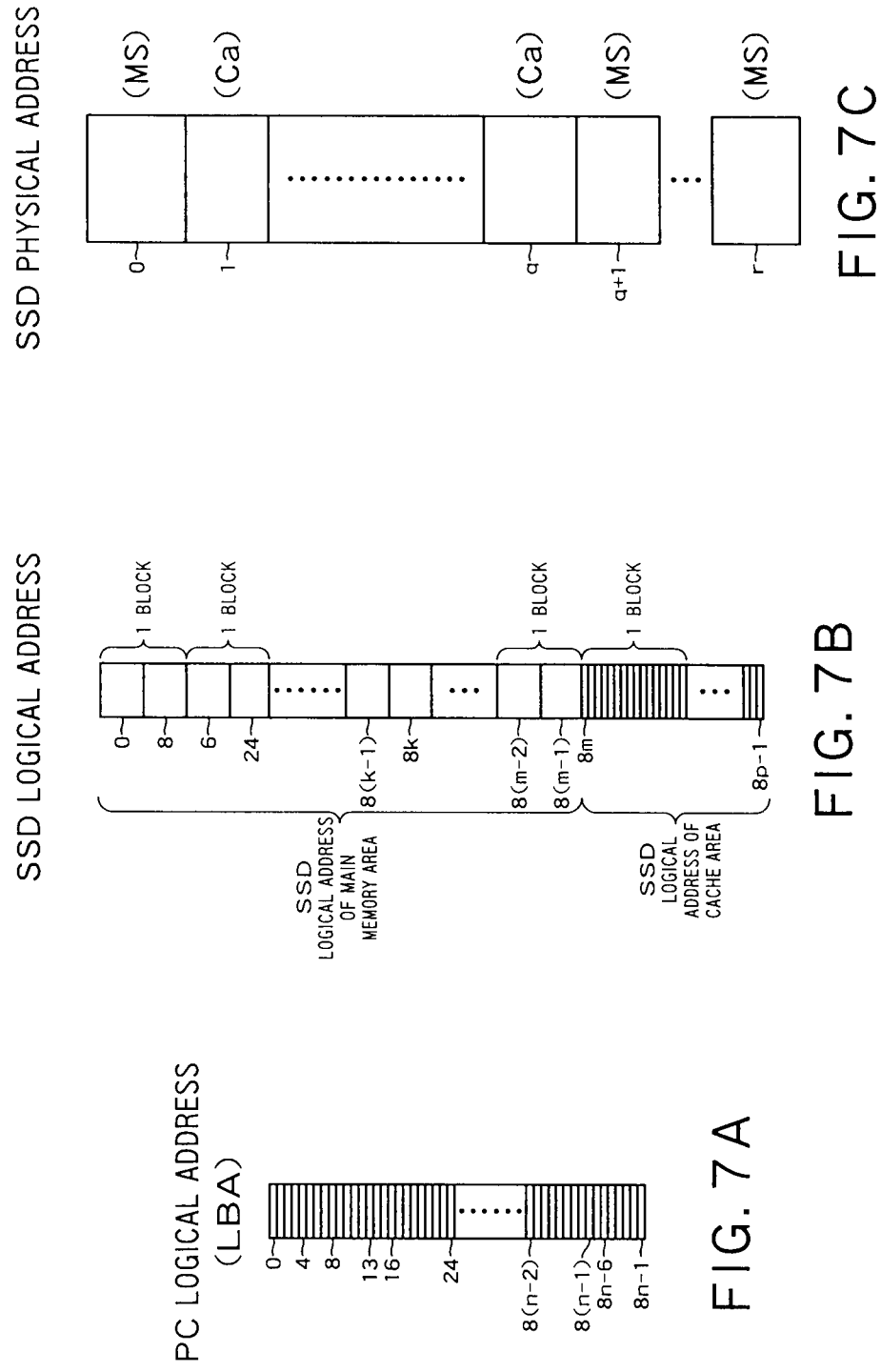
FIGS. 7A to 7C are conceptual diagrams showing a logical address of a PC (Personal Computer), a logical address of the memory 10, and a physical address of the memory 10, respectively.

FIGS. 7A to 7C are conceptual diagrams showing a logical address of a PC (Personal Computer), a logical address of the memory 10, and a physical address of the memory 10, respectively. The logical address of the PC (hereinafter, "PC address") shown in FIG. 7A is expressed by 0 to 8n−1, where n is an integer equal to or larger than 2. The logical address of the memory 10 (hereinafter, "SSD logical address") shown in FIG. 7B includes the logical addresses of the main memory area 12 0 to 8(m−1) and the logical addresses of the cache area 11 8m to 8p−1, where m is an integer equal to or larger than 2 and p is an integer equal to or larger than m+1. The physical address of the memory 10 (hereinafter, "SSD physical address") shown in FIG. 7C is expressed by 0 to r and assigned to every block, where r is a positive integer.

The management unit of the main memory area 12 is (½) block, for example. Assume that one block can store data of 512 Kbits, and the management unit of the main memory area 12 has a memory capacity of 256 Kbits. The management unit of the cache area 11 is, for example, (1/16) block. Assume that one block can store data of 512 Kbits, and the management unit of the cache area 11 has a memory capacity of 64 Kbits. According to the first embodiment, the capacity of data included in an address of the PC logical addresses is 64 Kbits, which is the same as that of management unit of the cache area 11.

The memory capacity of management unit of the cache area 11 is smaller than that of management unit of the main memory area 12. In FIG. 7B, the area of one address in the cache area 11 is shown smaller (thinner) than that in the main memory area 12. The blocks are classified into the main memory area 12 and the cache area 11 depending on their corresponding SSD logical addresses. In the cases of the PC logical address and the SSD physical address, the main memory area 12 and the cache area 11 are not distinguished. To clearly distinguish the main memory area 12 from the cache area 11, blocks in the main memory area 12 are indicated by MS and blocks in the cache area 11 are indicated by Ca in FIG. 7C.

For example, frequently accessed low capacity data (low capacity data with high access probability) is stored in the cache area 11. Because the low capacity data is usually stored in the cache area, the management unit of the cache area 11 is segmented finer than that of the main memory area 12.

As the management unit of the main memory area 12 is (½) block, even if a part of the data is to be updated, the entire (½) block needs to be updated. As the management unit of the cache area 11 is (1/16) block, the data is updated per (1/16) block. Smaller management unit of the cache area 11 can reduce unnecessarily updated areas. If the cache area 11 stores low capacity data with high access probability, the number of updates in the main memory area 12 can be reduced. This leads to reduction in the numbers of erasures/writings in the main memory area 12 with large management unit, resulting in suppression of deterioration of the memory 10. According to the first embodiment, the cache area 11 that has smaller management unit than that of the main memory area 12 is provided in the memory 10, so that the lifetime of the memory 10 can be extended. The management units of the main memory area 12 and the cache area 11 are not limited to (½) block and (1/16) block, respectively. It suffices that the main memory area 12 have the management unit of (1/m) block and the cache area 11 have the management unit of (1/n) block (n>m, where m and n are positive numbers).

FIG. 8 is a logic/logic conversion table between the PC logical address and the SSD logical address. The logic/logic conversion table indicates the SSD logical addresses corresponding to the PC logical addresses. The SSD logical address of the main memory area 12 corresponds to (½) block, i.e., eight PC logical addresses. That is, the logic/logic conversion table in the main memory area 12 stores only the head address among eight PC logical addresses corresponding to an SSD logical address. For example, the SSD logical address "0" of the main memory area 12 corresponds to the PC logical addresses 8 to 15. However, only the PC logical address "8" which is the head address of the PC logical addresses 8 to 15 is stored in the logic/logic conversion table. "0xFF" indicates a hexadecimal number FF, which means an empty area (empty address).

In the cache area 11, the management unit of the SSD logical address is the same as that of the PC logical address, which is (1/16) block. One SSD logical address thus corresponds to one PC logical address in the logic/logic conversion table of the cache area 11.

FIG. 9 is a logical/physical conversion table between the SSD logical address and the SSD physical address. The logical/physical conversion table indicates the SSD physical addresses corresponding to the SSD logical addresses. When referring to the logic/logic conversion table and the logical/physical conversion table, it is possible to find which memory area data indicated by a PC logical address is stored in. For example, the logic/logic conversion table and the logical/physical conversion table are stored in the RAM 20 shown in FIG. 1.

The correspondence relationship between the PC logical address and the SSD logical address shown in the logic/logic conversion table is not fixed but updated every time the data is written in an empty area in the memory, as will be described later. The correspondence relationship between the SSD logical address and the SSD physical address shown in the logical/physical conversion table is not updated basically. However, the logical/physical conversion table may be changed by wear leveling or the like.

(Reading Operation)

Figure 10:
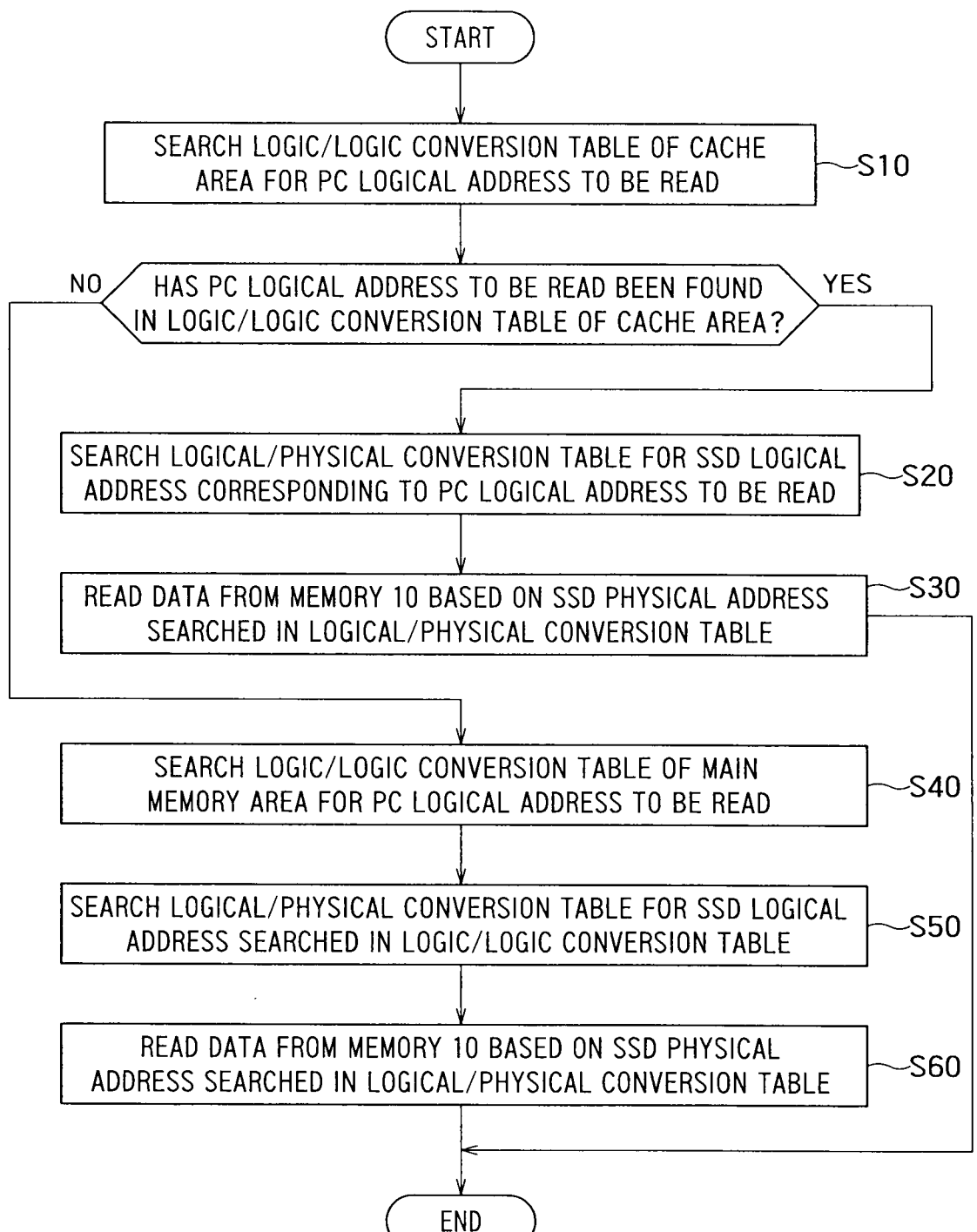
FIG. 10 is a flowchart showing a reading operation of the memory 10 according to the first embodiment.

FIG. 10 is a flowchart showing a reading operation of the memory 10 according to the first embodiment. The data reading operation is described next with reference to FIGS. 6 to 10. In the reading operation, the RAM control circuit 40 searches the logic/logic conversion table of the cache area 11 for a PC logical address to be read (S10). If the PC logical address to be read is found in the logic/logic conversion table of the cache area 11, the RAM control circuit 40 searches the logical/physical conversion table shown in FIG. 9 for the SSD logical address corresponding to the PC logical address to be read (S20). The NAND control circuit 30 reads the data from the memory 10 based on the SSD physical address searched in the logical/physical conversion table (S30). When the PC logical address to be read is found in the logic/logic conversion table of the cache area 11, the logic/logic conversion table of the main memory area 12 is not searched.

If the PC logical address to be read is not found in the logic/logic conversion table of the cache area 11, the RAM control circuit 40 searches the logic/logic conversion table of the main memory area 12 for the PC logical address to be read (S40). The RAM control circuit 40 searches the logical/physical conversion table shown in FIG. 9 for the SSD logical address searched in the logic/logic conversion table (S50). The NAND control circuit 30 reads the data from the memory 10 based on the SSD physical address corresponding to the SSD logical address searched in the logical/physical conversion table (S60). Because the cache area 11 stores data with high access probability, the RAM control circuit 40 searches first the cache area 11 and then the main memory area 12.

Specifically, if the PC logical address "4" is to be read, the RAM control circuit 40 first searches the logic/logic conversion table of the cache area 11 for the PC logical address "4". In the example shown in FIG. 8, the data of the PC logical address "4" is stored in the memory area corresponding to the SSD logical address "8p–2". The RAM control circuit 40 then searches the logical/physical conversion table for the SSD physical address corresponding to the SSD logical address "8p–2". According to the example shown in FIG. 9, the SSD physical address corresponding to the SSD logical address "8p–2" is "1".

According to the SSD logical address (management unit) of the cache area 11, 16 addresses are assigned to one block as described above. When one block is divided into 16 segments, the SSD logical address (management unit) of the cache area 11 corresponds to one of them. The MPU 50 thus needs to calculate which segment of 16 segments in the block of the SSD physical address "1" the SSD logical address "8p–2" corresponds to. The segment storing data in the block is determined by the remainder of division of the SSD logical address (8p–2) by 16. For example, when the remainder of (8p–2)/16 is 14, the 14th segment corresponds to the SSD logical address "8p–2" where the head segment of the SSD physical address "1" is 0. The NAND control circuit 30 thus reads the data from the 14th segment of the SSD physical address "1" (the head segment of that block is 0).

According to another specific example, if the PC logical address "9" is to be read, the RAM control circuit 40 first searches the logic/logic conversion table of the cache area 11 for the PC logical address "9". The SSD logical address that corresponds to the PC logical address "9" shown in FIG. 8 does not exist. The RAM control circuit 40 then searches the logic/logic conversion table of the main memory area 12.

One SSD logical address (management unit) of the main memory area 12 corresponds to eight PC logical addresses, and the logic/logic conversion table stores only the head PC logical addresses. The MPU 50 identifies the SSD logical address using the result of multiplying the integer part of quotient of the SSD logical address divided by 8 by 8. For example, the MPU 50 divides 9 by 8 and multiplies the integer part of the quotient by 8. The MPU 50 obtains "8" as the result. The RAM control circuit 40 searches the logic/logic conversion table for the SSD logical address corresponding to the PC logical address "8". The SSD logical address "0" corresponding to the PC logical address "8" is obtained from the logic/logic conversion table. The data indicated by actual PC logical address "9" is therefore stored in the memory area corresponding to the SSD logical address "0".

The RAM control circuit 40 further searches the logical/physical conversion table for the SSD physical address corresponding to the SSD logical address "0". The SSD physical address "q+1" corresponding to the SSD logical address "0" is thus obtained. The data indicated by the PC logical address "9" is therefore stored in the memory area corresponding to the SSD physical address "q+1".

The MPU 50 needs to calculate which segment of 16 segments in the block of the SSD physical address "q+1" the PC logical address "9" corresponds to. The segment storing data in the block is determined from the remainder of division of the PC logical address "9" by 8. In this case, the remainder is 1. The first segment thus corresponds to the PC logical address "9" where the head segment of the SSD physical address "q+1" is indicated by 0. The NAND control circuit 30 reads the data from the first segment of the SSD physical address "q+1" (the head segment of that block is indicated by 0).

As described above, to read the data from the cache area 11, the MPU 50 calculates the remainder of (the SSD logical address/16) to identify the exact segment in the block. When the data is read from the main memory area 12, the MPU 50 calculates ((integer part of PC logical address/8)*8) to identify the PC logical address. The MPU 50 calculates the remainder of (PC logical address/8) to identify the exact segment in the block.

(Writing Operation)

Figure 12:
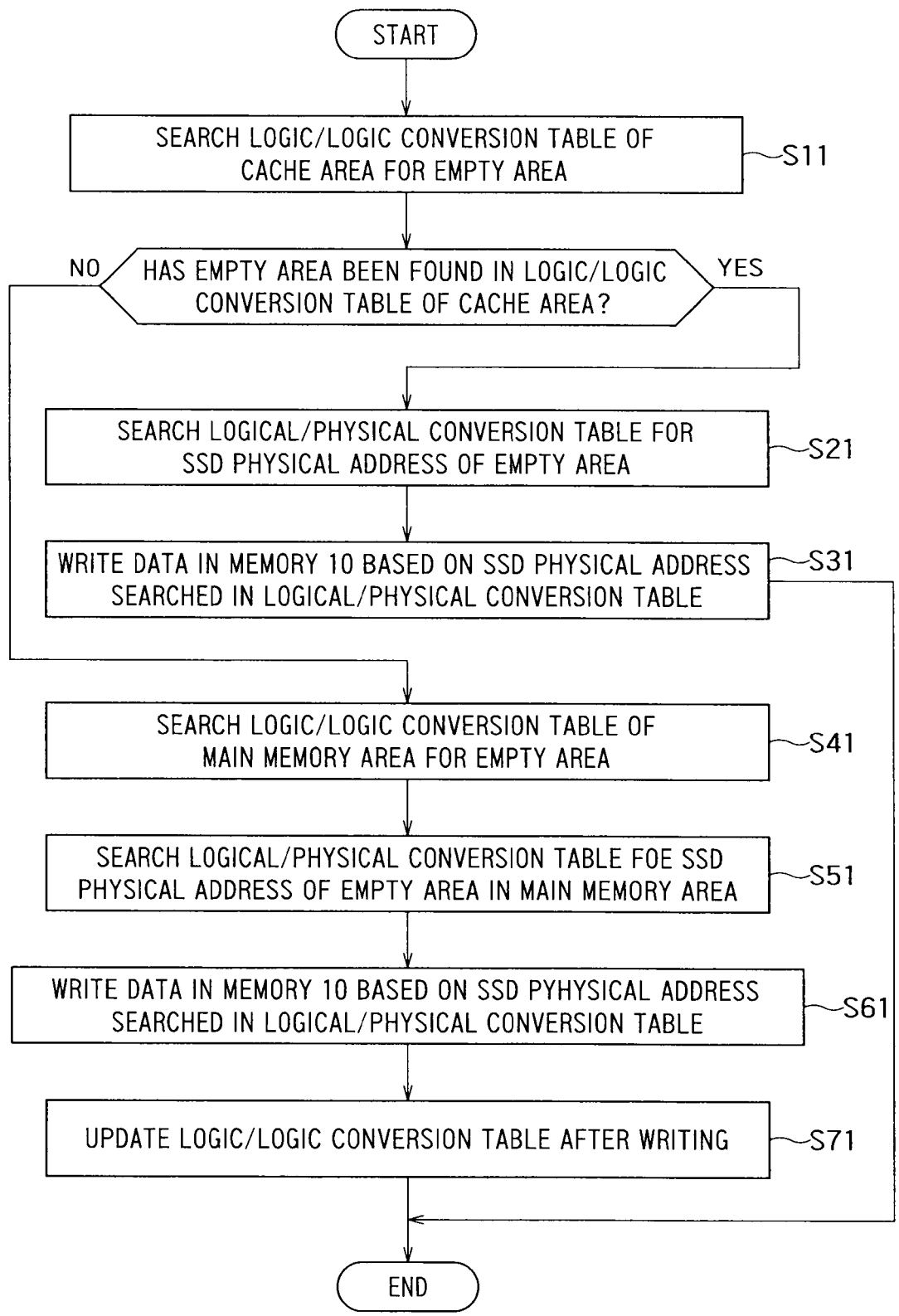
FIG. 12 is a flowchart showing a writing operation of the memory 10 according to the first embodiment.

FIG. 12 is a flowchart showing a writing operation of the memory 10 according to the first embodiment. The data writing operation is described next with reference to FIGS. 6 to 9 and 12. In the first embodiment, data is written in the main memory area 12 and the cache area 11 using a write-once method. If the capacity of data to be written is higher than a predetermined value, the data is written in the main memory area 12. If the capacity of the data to be written is lower than the predetermined value, the data is written in the cache area 11. The writing operation in the cache area 11 will be described below.

In the writing operation, the RAM control circuit 40 searches the logic/logic conversion table of the cache area 11 for an empty area (S11). If the empty area is found in the logic/logic conversion table of the cache area 11, the RAM control circuit 40 searches the logical/physical conversion table shown in FIG. 9 for the SSD physical address of the empty area (S21). The NAND control circuit 30 writes the data in the memory 10 based on the SSD physical address searched in the logical/physical conversion table (S31). If the empty area is found in the logic/logic conversion table of the cache area 11, the RAM control circuit 40 does not search the logic/logic conversion table of the main memory area 12 for the empty area. If the empty area is not found in the logic/logic conversion table of the cache area 11, the RAM control circuit 40 searches the logic/logic conversion table of the main memory area 12 for the empty area (S41). The RAM control circuit 40 searches the logical/physical conversion table shown in FIG. 9 for the SSD physical address of the empty area in the main memory area 12 (S51). The NAND control circuit 30 writes the data in the memory 10 based on the SSD physical address searched in the logical/physical conversion table (S61). After writing, the RAM control circuit 40 updates the logic/logic conversion table (S71).

Specifically, if the PC logical address "9" is to be written, the RAM control circuit 40 first searches the logic/logic conversion table of the cache area 11 for the empty area. According to the example shown in FIG. 8, the empty area (0xFF) exists at the SSD logical address "8(p–1)". The RAM control circuit 40 then searches the logical/physical conversion table for the SSD physical address corresponding to the SSD logical address "8p–1". In the example shown in FIG. 9, the SSD physical address that corresponds to the SSD logical address "8p–1" is "1".

Next, the MPU 50 calculates which segment of 16 segments in the block of the SSD physical address "1" the SSD logical address "8p–1" corresponds to. The specified area that is to store data in the block is determined by the remainder of division of the SSD logical address (8p–1) by 16. For example, if the remainder of (8p–1)/16 is 15, the 15th segment (the last segment of the SSD physical address "1") corresponds to the SSD logical address "8p–1" where the head segment of the SSD physical address "1" is indicated by 0. The NAND control circuit 30 then writes the data in the last segment of the SSD physical address "1".

After the data is written, the RAM control circuit 40 searches the logic/logic conversion table of the cache area 11 for the PC logical address "9". If the PC logical address "9" is not found in the logic/logic conversion table of the cache area 11, the RAM control circuit 40 updates the PC logical address corresponding to the SSD logical address "8p−1" in the logic/logic conversion table of the cache area 11 from "0xFF" to "9" as shown in FIG. 11.

If the PC logical address "9" is found in the logic/logic conversion table of the cache area 11, the RAM control circuit 40 updates the existing PC logical address "9" to the empty address "0xFF" in the logic/logic conversion table of the cache area 11 and the PC logical address corresponding to the SSD logical address "8p−1" to "9". According to the specific example shown in FIG. 11, because the existing PC logical address "9" is not found in the logic/logic conversion table of the cache area 11, the RAM control circuit 40 only updates the PC logical address corresponding to the SSD logical address "8p−1" from "0xFF" to "9".

For example, if not the PC logical address "9" but the PC logical address "4" is written for the SSD logical address "8p−1", the PC logical address "4" is found in the logic/logic conversion table of the cache area 11. The RAM control circuit 40 updates the SSD logical address "8p−2" corresponding to the existing PC logical address "4" to the empty address "0xFF" and the PC logical address corresponding to the SSD logical address "8p−1" which is the empty address to "4" in the logic/logic conversion table of the cache area 11, as shown in FIG. 13. In this way, the PC logical addresses in the logic/logic conversion table are updated.

(Writing Operation: The Case that Cache Area 11 is Full)

Figure 14:
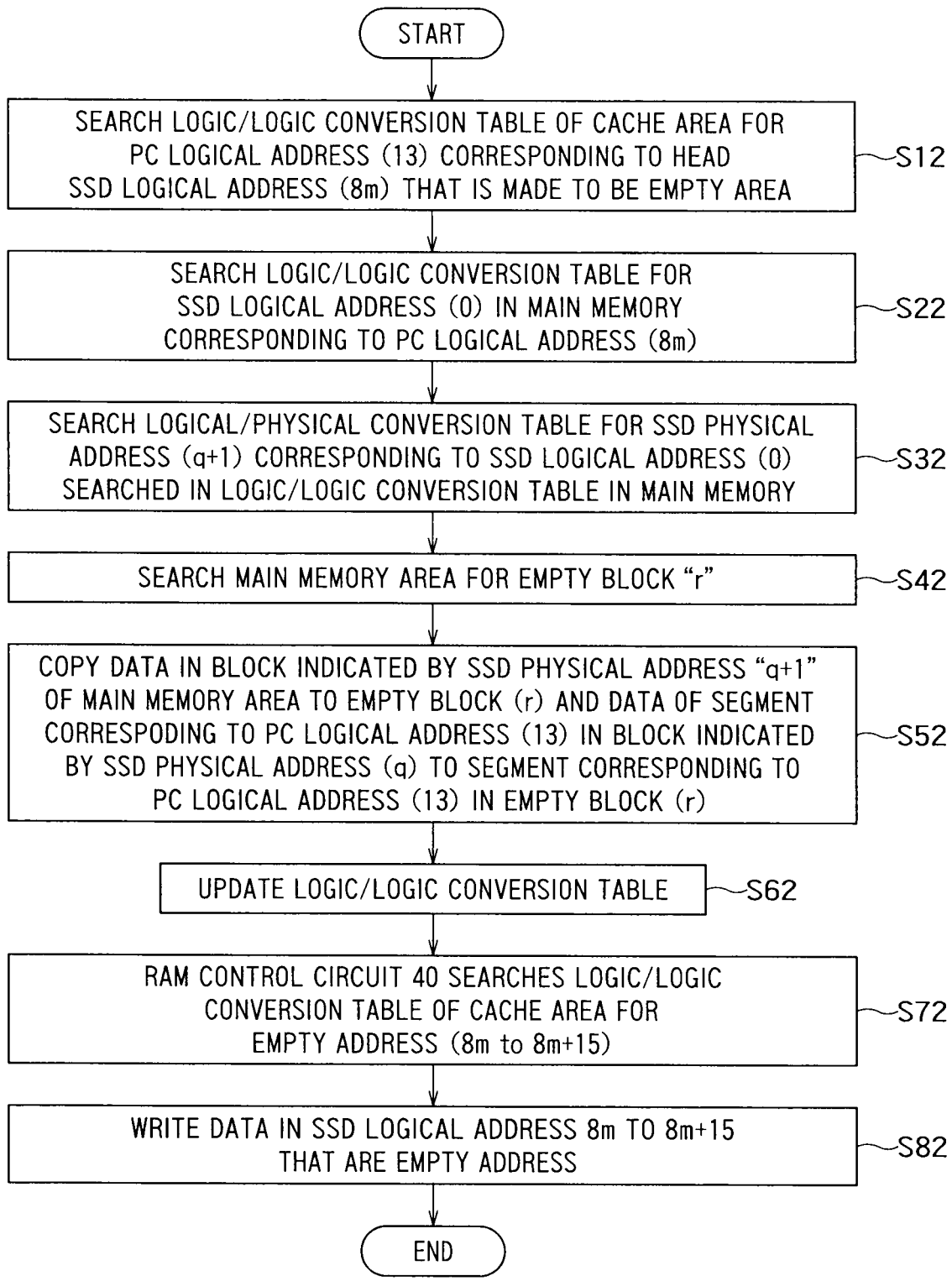
FIG. 14 is a flowchart showing the writing operation of the memory 10 according to the first embodiment.

FIG. 14 is a flowchart showing the writing operation of the memory 10 according to the first embodiment (when the cache area 11 is full).

If the cache area 11 does not include any empty area, i.e., is full, the existing data in the cache area 11 needs to be copied to the main memory area 12 so that addresses of the cache area 11 become empty. FIG. 15 is a logic/logic conversion table after update shown in FIG. 13. Assume that the SSD logical addresses 8m to 8m+15 in the cache area 11 shown in FIG. 15 are made to be empty. As can be understood from the logical/physical conversion table shown in FIG. 9, the SSD physical address corresponding to the SSD logical addresses 8m to 8m+15 is "q". The data in the block indicated by the physical address "q" shown in FIG. 7C is thus moved.

First, the RAM control circuit 40 searches the logic/logic conversion table of the cache area 11 for the PC logical address corresponding to the head SSD logical address 8m among the SSD logical addresses 8m to 8m+15 (S12). As can be understood from the logic/logic conversion table of the cache area 11 shown in FIG. 15, the PC logical address that corresponds to the SSD logical address 8m is "13".

The RAM control circuit 40 then searches the logic/logic conversion table for the SSD logical address corresponding to the PC logical address "13" in the main memory (S22). As can be understood from the logic/logic conversion table of the main memory area 12 shown in FIG. 15, the SSD logical address corresponding to the PC logical address "13" in the main memory is included in the SSD logical address "0". This is because the SSD logical address "0" corresponds to the PC logical addresses 8 to 15.

The RAM control circuit 40 searches the logical/physical conversion table for the SSD physical address that corresponds to the SSD logical address "0" searched in the logic/logic conversion table (S32). As can be understood from the logical/physical conversion table shown in FIG. 9, the SSD physical address corresponding to the SSD logical address "0" is "q+1".

The main memory area 12 is searched for empty blocks (S42). For example, the RAM control circuit 40 searches the logic/logic conversion table and the logical/physical conversion table for the empty blocks. Assume that the SSD physical address "r" that corresponds to the SSD logical address 8(m−2) is the empty block.

Figures 16, 17:
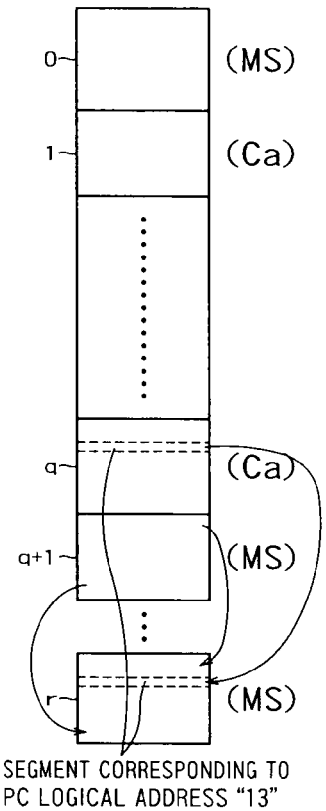
FIG. 16 is a conceptual diagram showing that data of the cache area 11 is copied to the main memory 12.
FIG. 17 shows a logic/logic conversion table updated in a write operation.

In this case, the NAND control circuit 30 copies the data in the block indicated by the SSD physical address "q+1" of the main memory area 12 to the block with the SSD physical address "r". As shown in FIG. 16, the data of the segment corresponding to the PC logical address "13" in the block indicated by the SSD physical address "q" of the cache area 11 is copied to the segment corresponding to the PC logical address "13" in the block with the SSD physical address "r" (S52). That is, the data at the SSD physical address "q+1" of the main memory area 12 is merged into the data at the PC logical address "13" of the block indicated by the SSD physical address "q" of the cache area 11 and the resulting merged data is copied to the empty block (r). This is because the data in the cache area 11 is usually newer than data in the main memory area 12.

More specifically, the MPU 50 calculates the remainder of division of the PC logical address "13" by 8. It is then found that the PC logical address "13" corresponds to the fifth segment within the block in the cache area 11 (where the first segment in that block is 0).

The logic/logic conversion table is then updated (S62). More specifically, the RAM control circuit 40 updates the PC logical address "8" corresponding to the SSD logical address "0" to the empty address 0xFF as shown in FIG. 17. The RAM control circuit 40 updates the PC logical address "13" corresponding to the SSD logical address 8m to the empty address 0xFF. Although not shown in FIG. 17, the PC logical address corresponding to the SSD physical address "r" (PC logical address corresponding to the SSD logical address 8(m−2)) is updated to "8". As a result, the SSD logical address 8m is made to be the empty address.

Steps S12 to S62 are repeated for the SSD logical addresses 8m+1 to 8m+15. The SSD logical addresses 8m to 8m+15 are thus made to be the empty addresses.

The RAM control circuit 40 searches the logic/logic conversion table of the cache area 11 for the empty address (S72). The data is written in the SSD logical addresses 8m to 8m+15 that are the empty addresses (S82).

(Writing Operation: The Case that Amount of Data in Main Memory Area 12 Exceeds Threshold)

Figure 18:
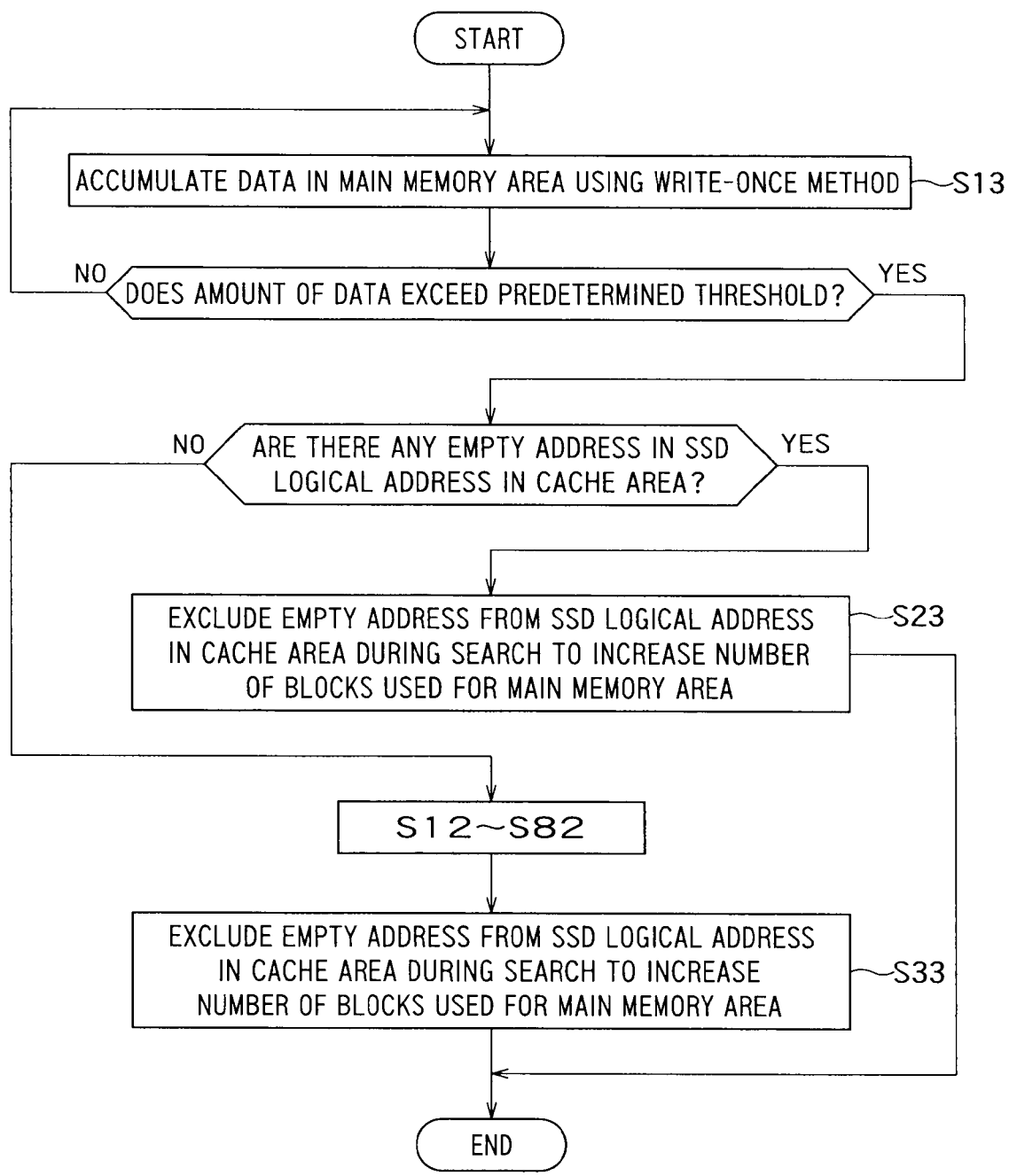
FIG. 18 is a flowchart showing the writing operation of the memory 10 according to the first embodiment.

FIG. 18 is a flowchart showing the writing operation of the memory 10 according to the first embodiment (when the amount of data in the main memory area 12 exceeds a threshold).

When the write-once method is employed in the main memory area 12, a large amount of data is accumulated in the main memory area 12 by the write-once method (S13). If the amount of data exceeds a predetermined threshold, the area that the RAM control circuit 40 searches for is reduced by excluding the empty address from the SSD logical addresses in the cache area 11 (S23). The reduced search area of the cache area 11 in the logic/logic conversion table allows the number of the SSD logical addresses in the cache area 11 to be substantially reduced. The number of blocks used for the cache area 11 is reduced accordingly and the number of blocks used for the main memory area 12 is relatively increased.

If the cache area 11 is full, a part of the data in the cache area 11 is moved to the main memory area 12 as in steps S12 to S82. The SSD logical addresses of the cache area 11 that become the empty addresses are excluded from search (S33). Because the number of blocks used for the cache area 11 is reduced, the number of blocks used for the main memory area 12 is relatively increased.

The number of the SSD logical addresses to be excluded from search is at least the number that corresponds to the management unit of the main memory area 12 (for example, 8 addresses). The number of the SSD logical addresses to be excluded from search is preferably the number that corresponds to the block (multiples of 16). This is because the management is easy. A plurality of thresholds for the amount of data in the main memory area can be provided. The cache area 11 thus can be changed into the main memory area 12 in a stepwise manner.

Figure 19:
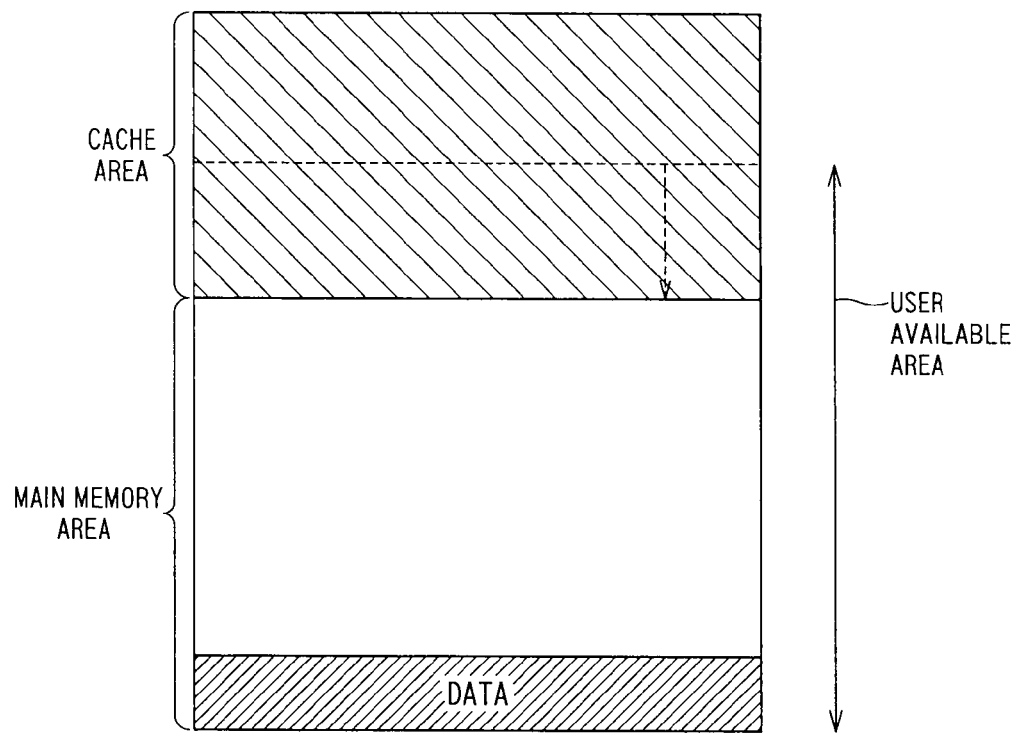
FIGS. 19 to 22 are conceptual diagrams showing changes of the cache area 11 and the main memory area 12 in the memory 10 according to the first embodiment.

FIGS. 19 to 22 are conceptual diagrams showing changes of the cache area 11 and the main memory area 12 in the memory 10 according to the first embodiment. As shown in FIG. 19, when a small amount of data is accumulated in the main memory area 12, the cache area 11 is extended. That is, the search area of the SSD logical address in the cache area 11 is extended. The RAM control circuit 40 searches the cache area 11 for more SSD logical addresses and thus the capacity of the cache area 11 is inevitably increased. In this case, a part of user available area can be used as the cache area 11.

Figure 20:
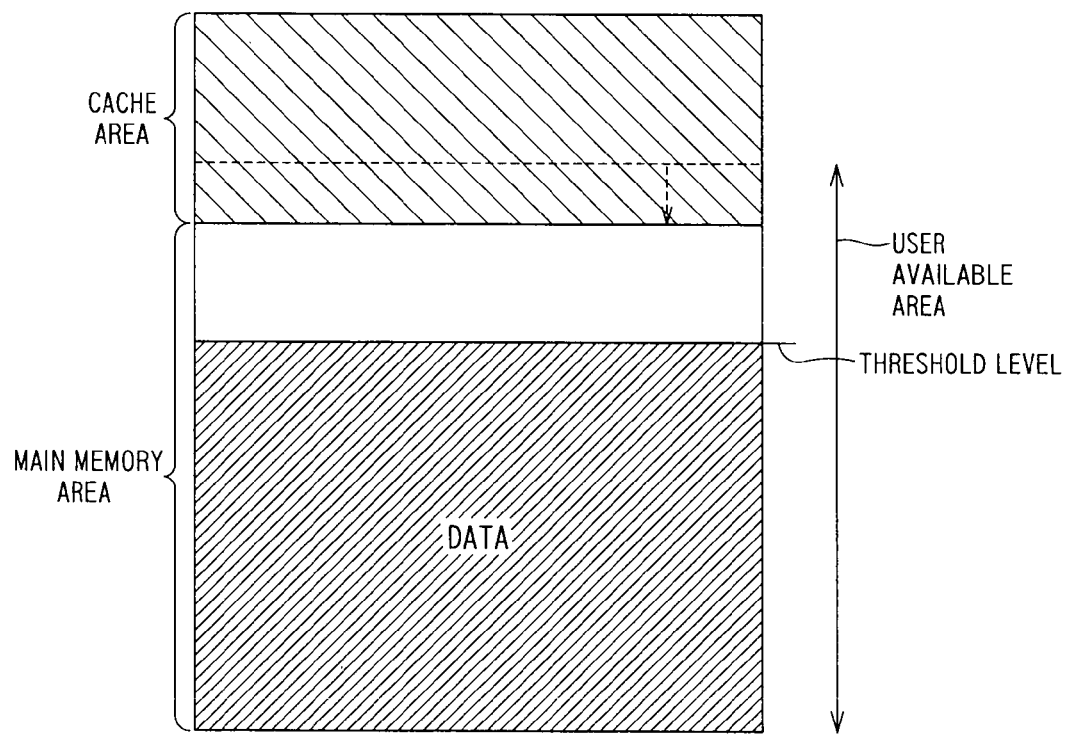
Figure 21:
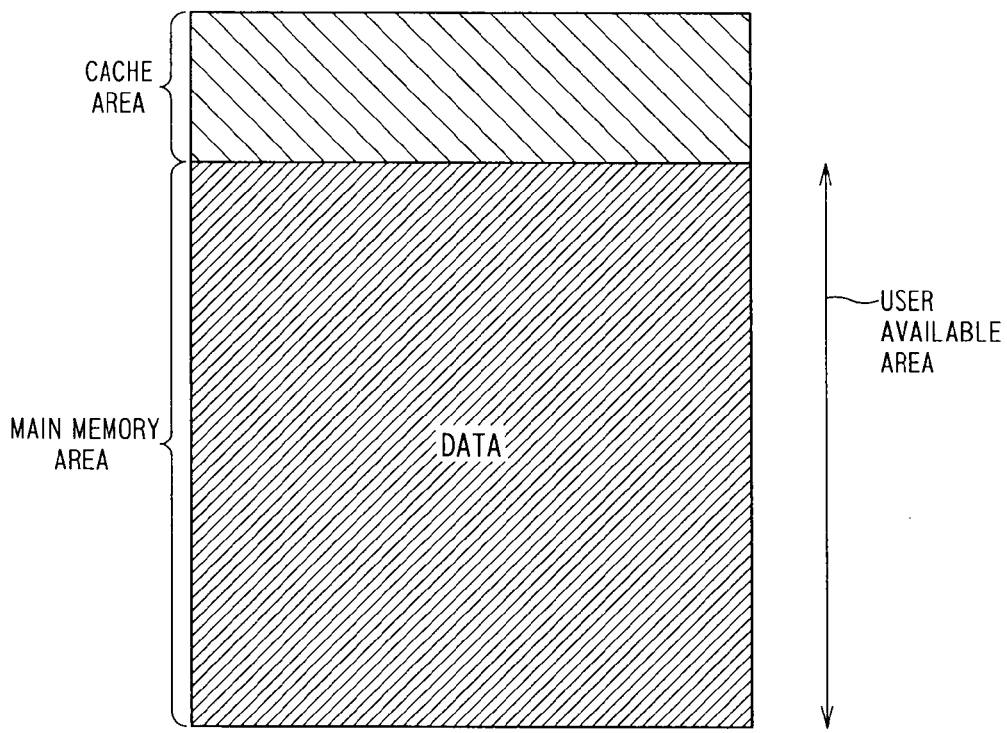

As shown in FIG. 20, when the amount of data in the main memory area 12 exceeds the threshold, the cache area 11 is reduced as described above with reference to FIG. 18. The cache area 11 can be reduced in a stepwise manner depending on the amount of data by using the thresholds, as shown in FIG. 20. Alternatively, as shown in FIG. 21, when the amount of data exceeds one threshold, the entire user available area that has been in the cache area 11 is changed into the main memory area 12.

Figure 22:
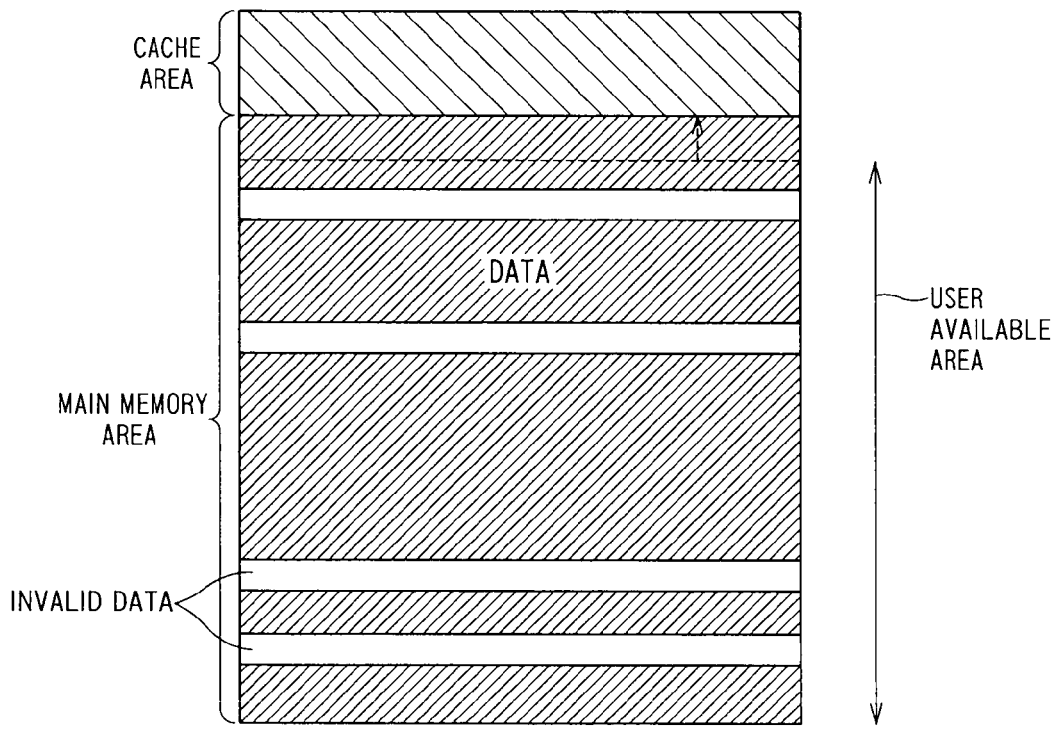

When the main memory area 12 is full, the cache area 11 can be changed into the main memory area 12 as shown in FIG. 22. That is, the search area of the SSD logical address in the cache area 11 is further reduced. The main memory area 12 thus can store data with higher capacity beyond the user available area. By using a part of the cache area 11 as the main memory area 12 as described above, erasable invalid data is increased. Erasable empty blocks are then more likely to be generated. The frequency of data reduction is thus reduced as will be described later, resulting in the memory 10 with extended lifetime.

Generally, when the main memory area 12 employs the write-once method on the management unit basis, if the amount of data exceeds a predetermined amount (user available amount), the data in the main memory area 12 needs to be reduced. According to the data reduction operation, valid data is copied to other memory areas and invalid data is erased. In the data reduction operation, the valid data needs to be copied to the other memory areas unlike mere erasing on the block unit. The number of the data reduction operations is thus preferably made to be small as soon as possible. If the reduction operation is performed frequently, the memory 10 may be deteriorated in a short time.

According to the first embodiment, when the data in the main memory area 12 exceeds the predetermined amount, a part of the cache area 11 is assigned to the main memory area 12. The write-once area in the main memory area 12 is thus increased, so that the reduction operation starts later and the period of the reduction operation is extended. The extended period of the reduction operation reduces the frequency of data erasure and writing, resulting in suppression of deterioration of the memory 10. Further, the extended period of the reduction operation generates more invalid data. Much invalid data means that the amount of effective data that needs to be copied in the reduction operation is small. When the amount of data to be copied is small, the amount of data to be erased in the reduction operation can be reduced. Much invalid data also means high possibility that the data is erased on the block unit. Larger number of blocks to be erased enables longer period of the reduction operation accordingly. Particularly, when the management unit of the main memory area 12 is small, the amount of data subjected to the reduction operation is increased. Thus, the above effect is significant when the management unit of the main memory area 12 is small.

When the amount of data in the main memory area 12 is equal to or less than the threshold, the search area of the cache area 11 in the logic/logic conversion table can be increased. The number of blocks used for the cache area 11 is thus increased and the number of blocks used for the main memory area 12 is reduced.

As described above, according to the first embodiment, the NAND control circuit 30 dynamically changes the number of blocks in the main memory area 12 and the number of blocks in the cache area 11 depending on the amount of data in the cache area 11 or the amount of data in the main memory area 12. Accordingly, the period of the reduction operation can be extended and the deterioration of the memory 10 can be suppressed. As a result, the lifetime of the memory 10 becomes longer than conventional ones.

Second Embodiment

Figure 23:
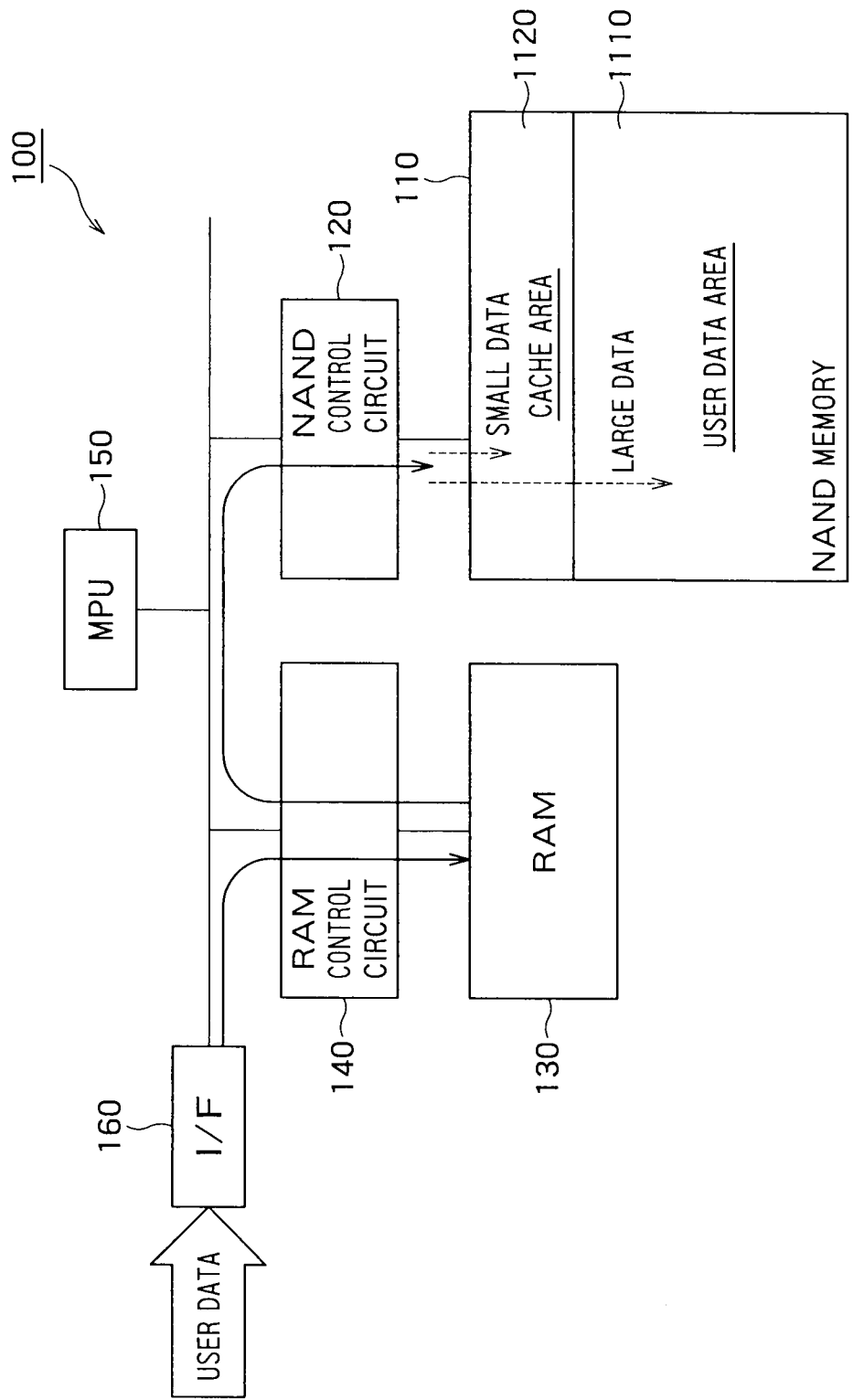
FIG. 23 shows an example of hardware configuration of a memory system according to a second embodiment of the present invention.

FIG. 23 shows an example of hardware configuration of a memory system according to a second embodiment of the present invention. The memory system 100 includes a flash memory (NAND memory according to the second embodiment) 110, a controller (NAND control circuit) 120 that controls the NAND memory 110, a random access memory (RAM) 130, and a controller (RAM control circuit) 140 that controls the RAM 130. The NAND memory 110 has at least a first storage area and a second storage area with different data usages. According to the second embodiment, the NAND memory 110 has a main storage area (user data area) 1110 storing mainly high capacity data (large data) and a cache area (hereinafter, "NAND cache") 1120 that processes low capacity data (small data). The RAM 130 is assumed to include a save area used when the data in the NAND memory 110 is erased and a cache area used when the data is read/written in/from the NAND memory 110.

The memory system 100 also includes a micro control unit 150 that manages block areas that are being used and that are not used in the NAND memory 110 based on control programs, as well as an interface circuit (IF) 160 connected to an external host (not shown, such as a personal computer (PC)).

When reading from the PC connected to the memory system 100 and writing in the memory system, low capacity data is accessed frequently in addition to high capacity data. When the low capacity data is written in the NAND memory 110 repeatedly, the amount of erasing is increased relative to the amount of writing, causing the NAND memory 110 to be deteriorated rapidly. While the RAM 130 is used as a writing cache to suppress such deterioration, the deterioration can be further suppressed when the NAND cache 1120 is provided in the NAND memory 110. Because the NAND cache 1120 mainly employs the write-once method, any management unit can be used. However, smaller management unit can manage the low capacity data easier, resulting in the suppression of the deterioration. The NAND cache with higher capacity can store lower capacity data, which is effective to reduce the deterioration.

Figure 24:
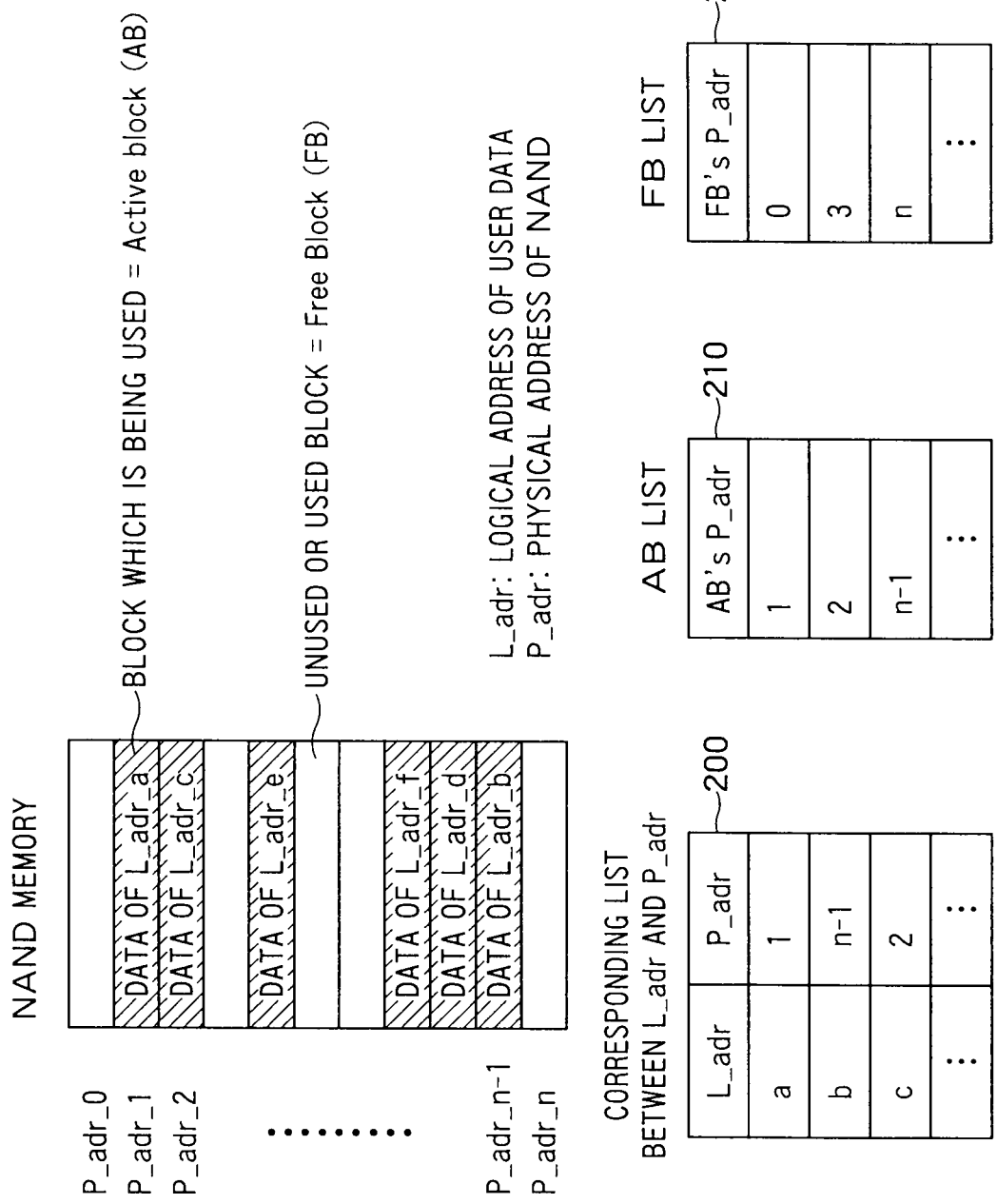
FIGS. 24 and 25 show examples of data management lists used for managing erasing in the memory system.
Figure 25:
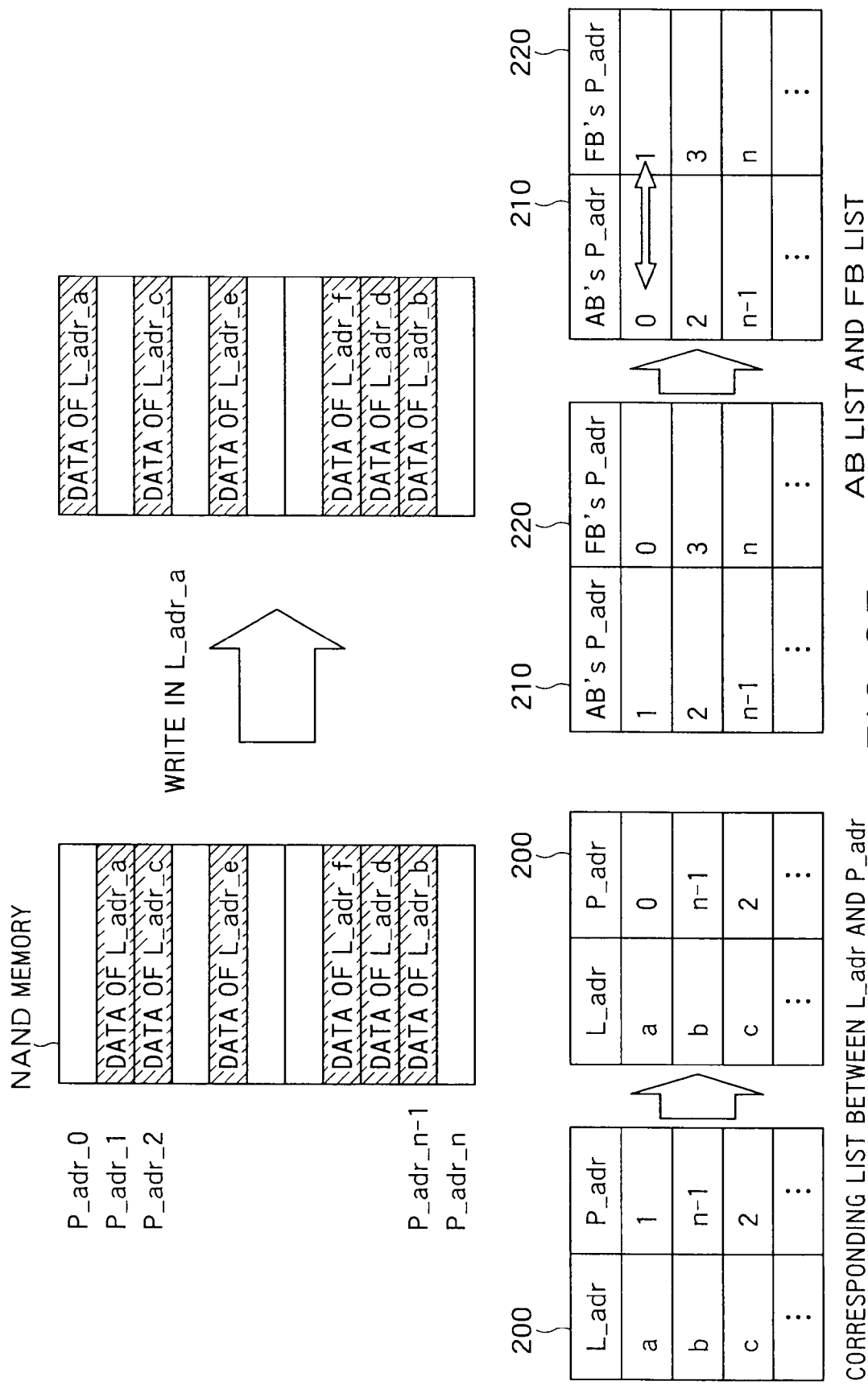

FIGS. 24 and 25 show examples of data management lists (tables) used for managing erasing in the memory system. The NAND control circuit 120 has, as shown in FIG. 24, a function of managing an AB list 210 that is a first list storing data which indicates block (hereinafter, Active Block; AB) areas being used among the erase units of the NAND memory 110 and an FB list 220 that is a second list storing data which indicates unused block or used and invalid block (hereinafter, Free Block; FB) areas.

Further, the NAND control circuit 120 also has a function of managing a correspondence list 200 between addresses (hereinafter, L_adr) managed by the PC and addresses (hereinafter, P_adr) indicating written positions in the NAND memory 110.

Further, the NAND control circuit 120 has a function of managing an FB list (1-1) 230 that is a third list storing data which indicates the used block areas for the cache area and an FB list (1-2) 240 that is a fourth list storing data which indicates the used block areas for the main storage area to ensure the erasing time for the cache area and the main storage area, respectively, as will be described later in FIGS. 28 and 29. The number of data entries in the FB list (1-1) 230 is different from the number of data entries in the FB list (1-2) 240. In the second embodiment, the number of entries in the FB list (1-2) 240 for the main storage area is smaller than the number of data entries in the FB list (1-1) 230 for the cache area.

An operational example of the memory system is described below with reference to FIG. 25. When data is written from the PC in the memory system, that is, in the NAND memory 110, the current data is written over the previous data. In this case, already written data in a block area (erase unit area) of the NAND memory 110 can be erased and the current data then be written in that block. By writing the data in a block area which is not used currently, however, the number of erasures can be reduced. At this time, the correspondence list 200 between L_adr and P_adr needs to be managed.

Such a memory system uses the AB list 210 that manages the currently used (used) block areas in the NAND memory 110 and the FB list (2) 220 that manages the unused block areas or the already used and invalid block areas.

When the NAND memory 110 is written, the current FB area is written (in an area employing the write-once method such as the cache area, writing is possible without obtaining new FB areas.). When the data is written in the NAND memory 110, the correspondence list 200 between L_adr and P_adr is updated such that a newly written block area is deleted from the FB list and registered in the AB list 210 and an invalid block area is deleted from the AB list 210 and registered in the FB list. The block area moves between the AB list 210 and the FB list 220 unless it cannot be used because of write/erase errors.

Figure 26:
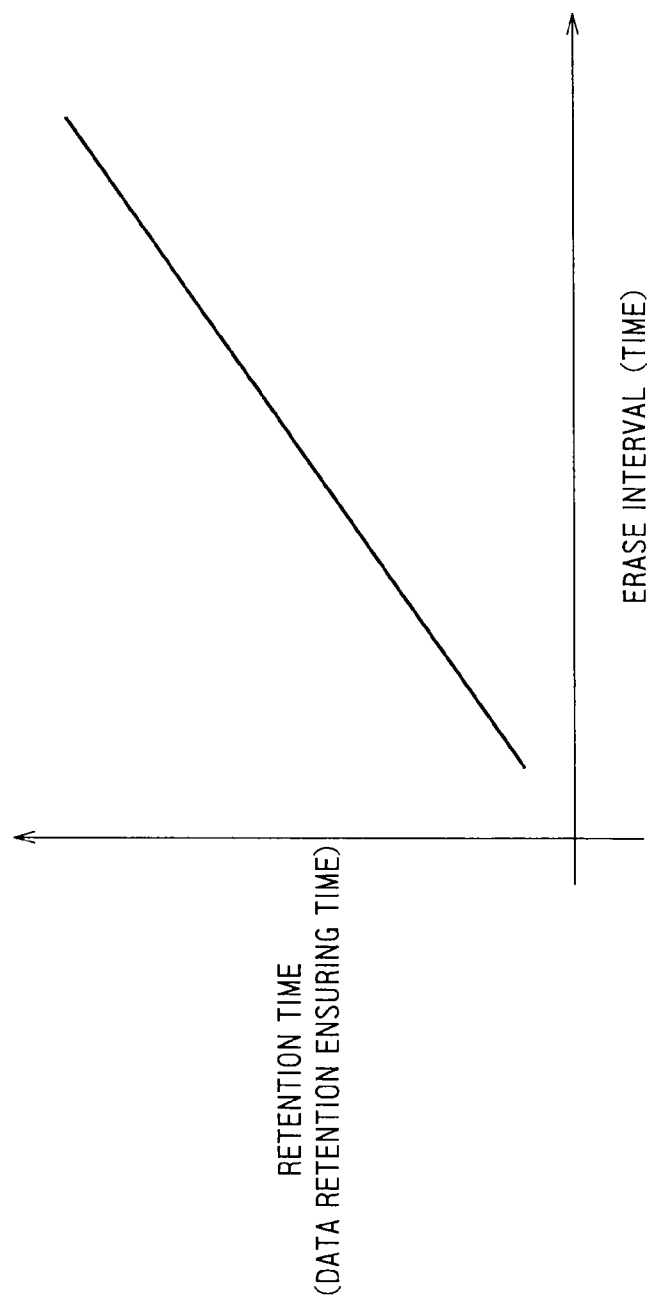
FIG. 26 shows a relationship between an erase interval and a retention time of the NAND memory 110.

When the NAND memory 110 is written, the invalid block area can be registered in the FB list 220 so as to be used for the next writing. Recently, however, the NAND memory 110 with high capacity has a relationship between an erase interval (time) and a retention time (data retention ensuring time) shown in FIG. 26. Shorter erase interval may deteriorate the retention characteristic. The block area that has been just registered in the FB list 220 is therefore not used for a while.

Figure 27:
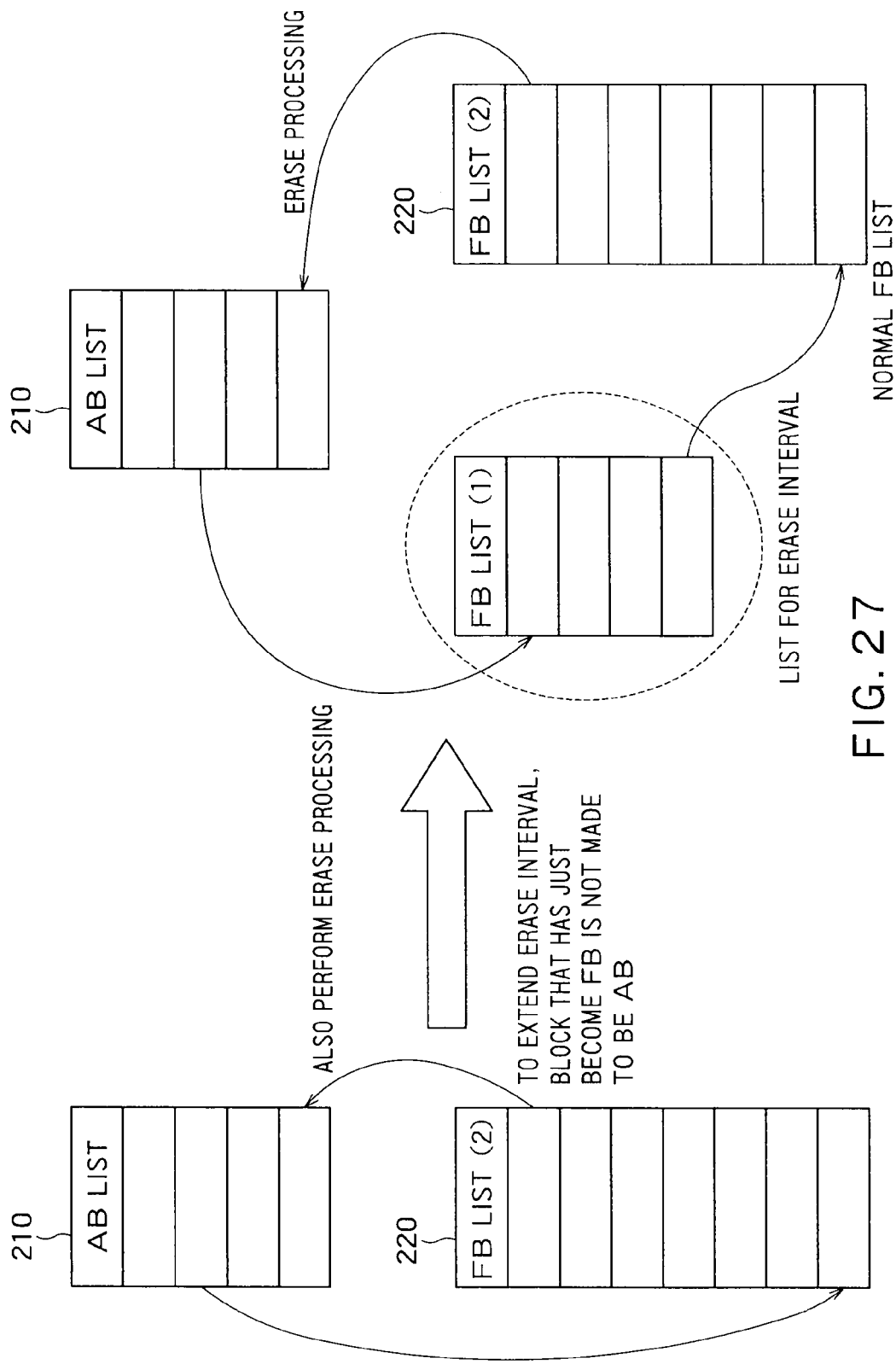
FIG. 27 shows examples of an FB list (1) with low priority of block areas to be newly written and an FB list (2) which is a remain of the FB list divided in the memory system shown in FIG. 23.

In view of the above, according to the present invention, the FB list 220 is divided in two lists as shown in FIG. 27 to ensure the erase interval. One of the lists is an FB list (1) with low priority of block areas to be newly written, and the other is an FB list (2) that is called a normal FB list 220.

Figure 28:
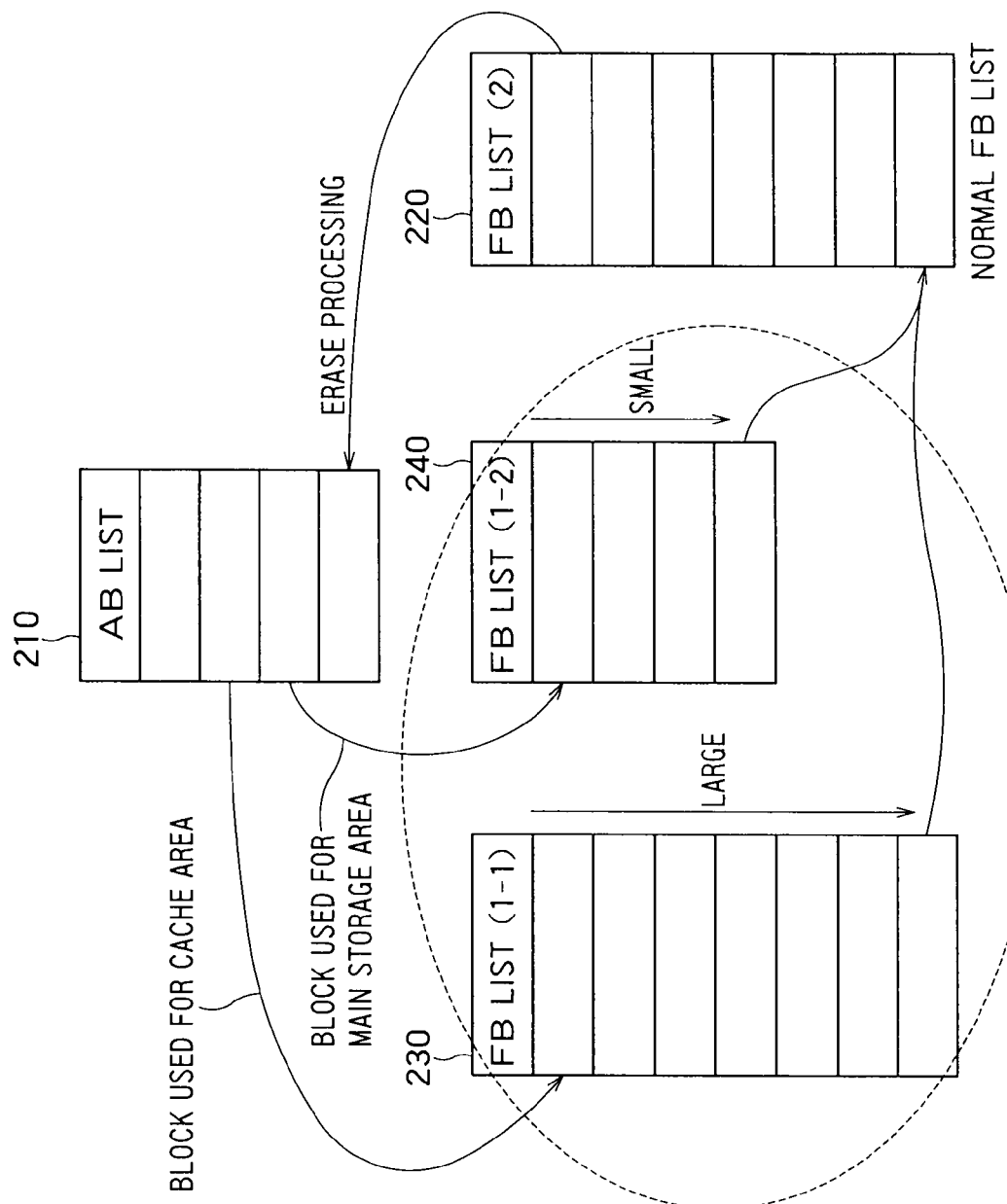
FIG. 28 is an example of a data managing erasing lists divided according to the write frequency for the cache area or for the main storage area in the memory system shown in FIG. 23.
Figure 29:
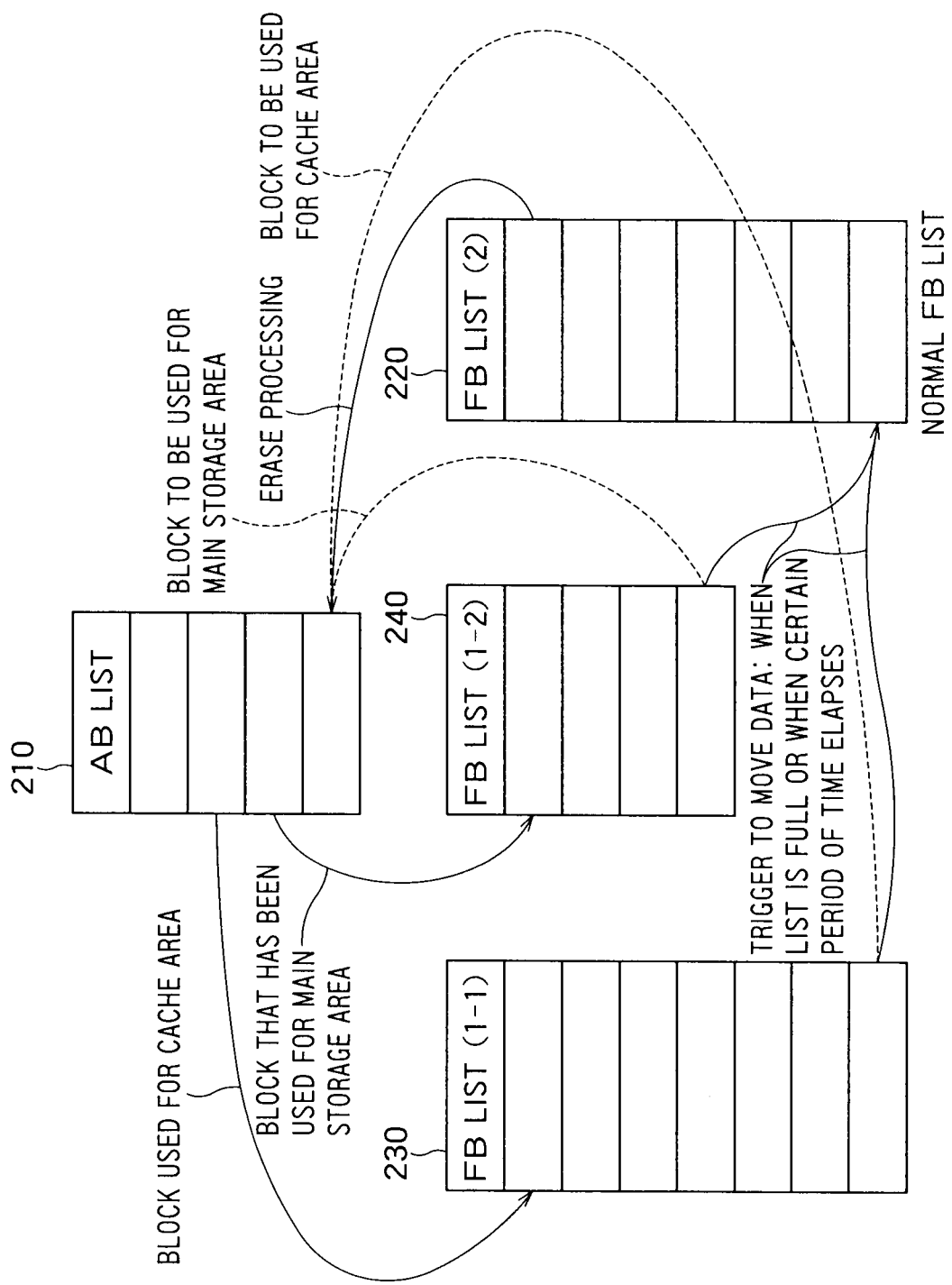
FIG. 29 shows an example of a relationship between an AB list & an FB list and a timing of moving data from a FB list for ensuring the erase interval to a normal FB list in the memory system shown in FIG. 23.

According to the present invention, as shown in FIG. 28, the FB list (1) is divided according to the write frequency, so that an FB list (1-1) 230 for the data of the block areas used in the cache area and an FB list (1-2) 240 for the data of the block areas used in the main storage area are provided.

The block area used in the cache area generally has a high data writing frequency and a short interval from when it is registered in the AB list 210 to when it is deleted therefrom. Meanwhile, the block area used in the main storage area has the opposite tendency to the block area used in the cache area (i.e., has a long interval from when it is registered in the AB list 210 to when it is deleted therefrom). The number of data entries in the FB list (1-1) 230 for the block area used in the cache area is set to be large. The number of data entries in the FB list (1-2) 240 for the block area used in the main storage area can be set smaller. In other words, the number of data entries in the FB list (1-2) 240 for the block area used in the main storage area is made to be smaller than the number of data entries in the FB list (1-1) 230 for the block area used in the cache area.

A trigger for moving the data from the FB list (1-1) 230 and the FB list (1-2) 240 to the normal FB list 220 can be performed when the lists are full or left for a certain period of time under time management.

When the trigger is performed after the lists are left for a certain period of time, there may be no block registered in the normal FB list 220, particularly when the number of FB blocks is small because they are mostly occupied by user data. In such a case, the AB list 210 obtains data from the FB list (1-1) 230 and the FB list (1-2) 240. If the data to be used is for the cache area, the data is obtained from the FB list (1-1) 230 for the cache area with a relatively inferior retention characteristic because the data does not need to be held for a long period of time. In contrast, if the data to be used is for the main storage area, the data is obtained from the FB list (1-2) 240 for the main storage area because the data needs to be held for a long period of time.

Volatile or non-volatile memories that are faster than the NAND memory 110 such as DRAMs, SRAMs, FeRAMs, MRAMs, and PRAMs can be used for the RAM 130 according to the second embodiment. While the NAND memory 110 is divided into the large data area and the small data area in the second embodiment, a medium data area storing data with medium capacity can be provided and implemented according to the second embodiment.

The invention claimed is:

1. A memory system comprising:
   a non-volatile memory including a plurality of blocks, each one of the plurality of blocks being a data erase unit; and
   a controller configured to assign one part of the plurality of blocks to a main memory area and to assign another part of the plurality of blocks to a cache area, wherein
   each block is divided into multiple management units,
   a plurality of data stored in the main memory area are managed with logical addresses, each logical address representing a first management unit,
   a plurality of data stored in the cache area are managed with logical addresses, each logical address representing a second management unit,
   the size of each second management unit is smaller than the size of each first management unit and the size of each of the first and second management units is smaller than the size of the data erase unit, and
   the controller dynamically changes the number of the blocks assigned to the main memory area and the number of the blocks assigned to the cache area in the non-volatile memory.

2. The memory system according to claim 1, wherein the controller reduces the number of the blocks assigned to the cache area and increases the number of blocks assigned to the main memory area when an amount of data stored in the main memory area is larger than a predetermined value.

3. The memory system according to claim 1, wherein the controller determines whether data to be written that is received from outside of the non-volatile memory is stored in the main memory area or the cache area on the basis of the amount of the data to be written.

4. The memory system according to claim 2, wherein the controller determines whether data to be written that is received from outside of the non-volatile memory is stored in the main memory area or the cache area on the basis of the capacity of the data to be written.

5. The memory system according to claim 1, wherein the cache area stores data that has with higher access probability as compared to data stored in the main memory area.

6. The memory system according to claim 2, wherein the cache area stores data that has with higher access probability as compared to data stored in the main memory area.

7. The memory system according to claim 3, wherein the cache area stores data that has with higher access probability as compared to data stored in the main memory area.

8. The memory system according to claim 2, wherein
the controller searches for a first logical address from among logical addresses aligned by the second management unit to store data received from outside of the non-volatile memory in the cache area, and
when the amount of data stored in the main memory area is larger than a predetermined value, the controller reduces number of logical addresses to be searched so as to reduce the number of the blocks assigned to the cache area and increase the number of the blocks assigned to the main memory area.

9. The memory system according to claim 2, wherein the controller increases the number of the blocks assigned to the cache area and decreases the number of blocks assigned to the main memory area when an amount of data stored in the main memory area is smaller than the predetermined value.

10. The memory system according to claim 1, wherein the controller determines whether the cache area is full, and when the cache area is full, the controller copies data in the cache area to the main memory area.

11. The memory system according to claim 2, wherein when the cache area is full, the controller copies data in the cache area to the main memory area.

12. The memory system according to claim 11, wherein when an amount of data stored in the main memory area is larger than the predetermined value and the cache area is full, the controller copies valid data in one block to the other block in the main memory area and erases data in the one block.

13. The memory system according to claim 1, further comprising a random access memory temporarily storing data which is written in, or read from, the nonvolatile memory.

14. The memory system according to claim 1, wherein the non-volatile memory is a NAND type flash memory.

* * * * *